(12) United States Patent
Sahin et al.

(10) Patent No.: US 10,607,054 B2
(45) Date of Patent: *Mar. 31, 2020

(54) METHODS AND SYSTEMS FOR CAPTURING BIOMETRIC DATA

(71) Applicant: Daon Holdings Limited, George Town (KY)

(72) Inventors: Tevfik Burak Sahin, Arlington, VA (US); Michael Peirce, Dublin (IE); Nicolas Jacques Jean Sezille, Dublin (IE); Conor Robert White, Fairfax, VA (US)

(73) Assignee: DAON HOLDINGS LIMITED, West Bay (KY)

( * ) Notice: Subject to any disclaimer, the term of this patent is extended or adjusted under 35 U.S.C. 154(b) by 0 days.

This patent is subject to a terminal disclaimer.

(21) Appl. No.: 16/263,062

(22) Filed: Jan. 31, 2019

(65) Prior Publication Data

US 2019/0163948 A1    May 30, 2019

Related U.S. Application Data

(63) Continuation of application No. 15/898,245, filed on Feb. 16, 2018, now Pat. No. 10,235,550, which is a
(Continued)

(51) Int. Cl.
   *G06K 9/00* (2006.01)
   *G06K 9/32* (2006.01)
   (Continued)

(52) U.S. Cl.
   CPC ..... *G06K 9/00013* (2013.01); *G06K 9/00087* (2013.01); *G06K 9/00255* (2013.01);
   (Continued)

(58) Field of Classification Search
   CPC .......... G06K 9/00006; G06K 9/00013; G06K 9/00221; G06K 9/00228; G06K 9/00255;
   (Continued)

(56) References Cited

U.S. PATENT DOCUMENTS 5,483,601 A    1/1996  Faulkner
5,493,621 A    2/1996  Matsumura
(Continued)

FOREIGN PATENT DOCUMENTS

EP    0 930 580 A2    7/1999
EP    0 930 580 A3    7/1999
(Continued)

OTHER PUBLICATIONS

Examination Report for counterpart Australian Application No. 2016200248, dated Jan. 25, 2016, pp. 1-3.
(Continued)

*Primary Examiner* — Andrew W Johns
(74) *Attorney, Agent, or Firm* — Kevin McDermott, Esq.

(57) ABSTRACT

A method of capturing biometric data is provided that includes activating a security application in a device. The security application is activated by an operator of the device and is configured to cause the device to display an outline image. Moreover, the method includes displaying the outline image in a stationary position on a display of the device, positioning desired biometric data proximate the device such that the desired biometric data appears as a biometric image on the device display, and monitoring the outline and biometric images shown on the device display. Furthermore, the method includes positioning the device and the desired biometric data to better align the outline and biometric images when the outline and biometric images do not align
(Continued)

and capturing the desired biometric data from an individual after approximately aligning the outline image with the biometric image.

34 Claims, 12 Drawing Sheets

Related U.S. Application Data continuation of application No. 15/591,650, filed on May 10, 2017, now Pat. No. 9,990,528, which is a continuation of application No. 15/344,019, filed on Nov. 4, 2016, now Pat. No. 9,679,193, which is a continuation of application No. 15/190,971, filed on Jun. 23, 2016, now Pat. No. 9,519,818, which is a continuation of application No. 15/047,869, filed on Feb. 19, 2016, now Pat. No. 9,400,915, which is a continuation of application No. 14/848,464, filed on Sep. 9, 2015, now Pat. No. 9,298,999, which is a continuation of application No. 14/825,507, filed on Aug. 13, 2015, now Pat. No. 9,202,102, which is a continuation of application No. 14/013,611, filed on Aug. 29, 2013, now Pat. No. 9,112,858, which is a continuation of application No. 13/025,729, filed on Feb. 11, 2011, now Pat. No. 8,548,206, which is a continuation-in-part of application No. 13/010,443, filed on Jan. 20, 2011, now Pat. No. 8,457,370.

(51) Int. Cl.
*H04L 29/08* (2006.01)
*H04L 29/06* (2006.01)

(52) U.S. Cl.
CPC ..... *G06K 9/00288* (2013.01); *G06K 9/00912* (2013.01); *G06K 9/32* (2013.01); *G06K 9/3208* (2013.01); *G06K 9/3233* (2013.01); *H04L 67/10* (2013.01); *H04L 63/0861* (2013.01)

(58) Field of Classification Search
CPC .. G06K 9/32; G07C 9/00158; G07C 9/00563; H04L 63/0861
See application file for complete search history.

(56) References Cited

U.S. PATENT DOCUMENTS

| | | |
|---|---|---|
| 5,862,249 A | 1/1999 | Jang et al. |
| 5,991,429 A | 11/1999 | Coffin et al. |
| 6,028,960 A | 2/2000 | Graf et al. |
| 6,111,517 A | 8/2000 | Atick et al. |
| 6,128,398 A | 10/2000 | Kuperstein et al. |
| 6,185,316 B1 | 2/2001 | Buffam |
| 6,314,197 B1 | 11/2001 | Jain et al. |
| 6,487,306 B1 | 11/2002 | Jain et al. |
| 6,546,122 B1 | 4/2003 | Russo |
| 6,836,554 B1 | 12/2004 | Bolle et al. |
| 6,901,155 B2 | 5/2005 | Xia et al. |
| 6,920,236 B2 | 7/2005 | Prokoski |
| 6,952,489 B1 | 10/2005 | Angelo et al. |
| 7,072,869 B2 | 7/2006 | Guthery |
| 7,110,581 B2 | 9/2006 | Xia et al. |
| 7,120,607 B2 | 10/2006 | Bolle et al. |
| 7,124,300 B1 | 10/2006 | Lemke |
| 7,136,514 B1 | 11/2006 | Wong |
| 7,151,846 B1 | 12/2006 | Fujii |
| 7,162,063 B1 | 1/2007 | Craine et al. |
| 7,233,686 B2 | 6/2007 | Hamid |
| 7,236,617 B1 | 6/2007 | Yau et al. |
| 7,317,814 B2 | 1/2008 | Kostrzewski et al. |
| 7,327,859 B1 | 2/2008 | Chau |
| 7,369,688 B2 | 5/2008 | Ser et al. |
| 7,369,759 B2 | 5/2008 | Kusakari et al. |
| 7,382,906 B2 | 6/2008 | Meier |
| 7,391,891 B2 | 6/2008 | Hillhouse |
| 7,400,749 B2 | 7/2008 | Hillhouse |
| 7,474,769 B1 | 1/2009 | McAfee, II et al. |
| 7,474,773 B2 | 1/2009 | Chau |
| 7,508,969 B2 | 3/2009 | Shinbata |
| 7,676,068 B2 | 3/2010 | Cervantes |
| 7,692,165 B2 | 4/2010 | Winkler |
| 7,697,730 B2 | 4/2010 | Okamura et al. |
| 7,725,733 B2 | 5/2010 | Higashiura et al. |
| 7,742,626 B2 | 6/2010 | Kamata et al. |
| 7,773,870 B2 | 8/2010 | Naruse |
| 7,797,549 B2 | 9/2010 | Main et al. |
| 7,894,640 B2 | 2/2011 | Itou |
| 7,899,217 B2 | 3/2011 | Uludag et al. |
| 7,940,956 B2 | 5/2011 | Kinoshita et al. |
| 7,944,476 B2 | 5/2011 | Ito et al. |
| 8,064,645 B1 | 11/2011 | Sezille |
| 8,085,992 B1 | 12/2011 | Sahin et al. |
| 8,090,246 B2 | 1/2012 | Jelinek |
| 8,144,941 B2 | 3/2012 | Adams et al. |
| 8,184,866 B2 | 5/2012 | Takaku et al. |
| 8,264,325 B2 | 9/2012 | Fukuda et al. |
| 8,269,857 B2 | 9/2012 | Ishizaka |
| 8,270,680 B2 | 9/2012 | Manabe et al. |
| 8,270,726 B2 | 9/2012 | Niinuma et al. |
| 8,270,729 B2 | 9/2012 | Saijo et al. |
| 8,275,178 B2 | 9/2012 | Boshra |
| 8,320,643 B2 | 11/2012 | Nakanowatari et al. |
| 8,396,262 B2 | 3/2013 | Aisaka et al. |
| 8,442,276 B2 | 5/2013 | Hamza |
| 8,457,370 B2 | 6/2013 | Sezille |
| 8,514,240 B2 | 8/2013 | Suzuki et al. |
| 8,526,682 B2 | 9/2013 | Sahin et al. |
| 8,543,823 B2 | 9/2013 | Carr et al. |
| 8,548,206 B2 | 10/2013 | Sahin et al. |
| 8,582,831 B2 | 11/2013 | Miura et al. |
| 8,600,123 B2 | 12/2013 | Abramovich et al. |
| 8,605,165 B2 | 12/2013 | Hanina et al. |
| 8,630,464 B2 | 1/2014 | Whillock et al. |
| 8,634,599 B2 | 1/2014 | Sahin et al. |
| 8,649,569 B2 | 2/2014 | Shindo et al. |
| 8,698,937 B2 | 4/2014 | Jeong |
| 8,787,627 B1 | 7/2014 | Freedman |
| 8,788,977 B2 | 7/2014 | Bezos |
| 8,795,187 B2 | 8/2014 | Morley et al. |
| 8,797,448 B2 | 8/2014 | Capata et al. |
| 8,811,681 B2 | 8/2014 | Watanabe |
| 8,842,888 B2 | 9/2014 | Pritikin et al. |
| 8,970,770 B2 | 3/2015 | Nanu et al. |
| 8,977,009 B2 | 3/2015 | Jo et al. |
| 9,013,271 B2 | 4/2015 | Aoki |
| 9,041,832 B2 | 5/2015 | Takahashi |
| 9,042,606 B2 | 5/2015 | Bebis et al. |
| 9,054,875 B2 | 6/2015 | Hama |
| 9,112,858 B2 | 8/2015 | Sahin et al. |
| 9,202,102 B1 | 12/2015 | Sahin et al. |
| 9,293,060 B2 | 3/2016 | Hanina et al. |
| 9,298,999 B2 | 3/2016 | Sahin et al. |
| 9,400,915 B2 | 7/2016 | Sahin et al. |
| 9,519,818 B2 | 12/2016 | Sahin et al. |
| 9,519,820 B2 | 12/2016 | Sezille |
| 9,519,821 B2 | 12/2016 | Sahin et al. |
| 9,679,193 B2 | 6/2017 | Sahin et al. |
| 10,116,903 B2 | 10/2018 | Hanina et al. |
| 2001/0026632 A1 | 10/2001 | Tamai |
| 2002/0035542 A1 | 3/2002 | Tumey et al. |
| 2002/0056043 A1 | 5/2002 | Glass |
| 2002/0146169 A1 | 10/2002 | Sukthankar et al. |
| 2003/0169334 A1 | 9/2003 | Braithwaite et al. |
| 2004/0052405 A1 | 3/2004 | Walfridsson |
| 2004/0057604 A1 | 3/2004 | David et al. |
| 2004/0100572 A1 | 5/2004 | Kim |
| 2004/0193893 A1 | 9/2004 | Braithwaite et al. |
| 2004/0215615 A1 | 10/2004 | Larsson et al. |
| 2004/0264742 A1 | 12/2004 | Zhang et al. |

(56) References Cited

U.S. PATENT DOCUMENTS

| | | |
|---|---|---|
| 2005/0100199 A1 | 5/2005 | Boshra |
| 2005/0175225 A1 | 8/2005 | Shinzaki |
| 2006/0078170 A1 | 4/2006 | Kamata et al. |
| 2006/0182318 A1 | 8/2006 | Shigeta |
| 2007/0201694 A1 | 8/2007 | Bolle et al. |
| 2007/0201727 A1 | 8/2007 | Birrell et al. |
| 2008/0063244 A1 | 3/2008 | Tanaka et al. |
| 2008/0065901 A1 | 3/2008 | Takaku et al. |
| 2008/0101663 A1 | 5/2008 | Lo et al. |
| 2008/0107309 A1 | 5/2008 | Cerni |
| 2008/0148059 A1 | 6/2008 | Shapiro |
| 2008/0192988 A1 | 8/2008 | Uludag et al. |
| 2008/0226136 A1 | 9/2008 | Takaku et al. |
| 2008/0240522 A1 | 10/2008 | Gutta |
| 2008/0273770 A1 | 11/2008 | Kohout |
| 2008/0298642 A1 | 12/2008 | Meenen |
| 2009/0160609 A1 | 6/2009 | Lin et al. |
| 2009/0169072 A1 | 7/2009 | Lo et al. |
| 2009/0171623 A1 | 7/2009 | Kiefer |
| 2009/0175506 A1 | 7/2009 | Polcha et al. |
| 2009/0208064 A1 | 8/2009 | Cambier |
| 2009/0243798 A1 | 10/2009 | Fukuda et al. |
| 2009/0245585 A1 | 10/2009 | Manabe et al. |
| 2009/0304237 A1 | 12/2009 | Yoshikawa et al. |
| 2009/0310831 A1 | 12/2009 | Zhang et al. |
| 2010/0002927 A1 | 1/2010 | Kalayeh |
| 2010/0008545 A1 | 1/2010 | Ueki et al. |
| 2010/0030696 A1 | 2/2010 | Naccache |
| 2010/0033302 A1 | 2/2010 | Yamamoto |
| 2010/0135540 A1 | 6/2010 | Cervantes |
| 2010/0161488 A1 | 6/2010 | Evans et al. |
| 2010/0202665 A1 | 8/2010 | Mohammad et al. |
| 2010/0228489 A1 | 9/2010 | Leuthardt et al. |
| 2010/0253471 A1 | 10/2010 | Abe |
| 2010/0316264 A1 | 12/2010 | Ferren et al. |
| 2010/0322484 A1 | 12/2010 | Hama et al. |
| 2010/0329568 A1 | 12/2010 | Gamliel et al. |
| 2011/0016317 A1 | 1/2011 | Abe |
| 2011/0153362 A1 | 6/2011 | Valin et al. |
| 2011/0277019 A1 | 11/2011 | Pritchard, Jr. |
| 2012/0087549 A1 | 4/2012 | Benini |
| 2012/0194662 A1 | 8/2012 | Zhang et al. |

FOREIGN PATENT DOCUMENTS

| | | |
|---|---|---|
| EP | 1 562 134 A2 | 8/2005 |
| EP | 1 562 134 A3 | 8/2005 |
| EP | 1 903 509 A1 | 3/2008 |
| EP | 2 107 499 A1 | 10/2009 |
| EP | 2 244 224 A1 | 10/2010 |
| GB | 2 331 613 A | 5/1999 |
| JP | 2001-273498 A | 10/2001 |
| JP | 2003/317100 A | 11/2003 |
| JP | 2005242908 A | 9/2005 |
| JP | 2007-334659 | 12/2007 |
| JP | 2007-334659 A | 12/2007 |
| JP | 2008-070926 A | 3/2008 |
| JP | 2008-071030 | 3/2008 |
| JP | 2008-071030 A | 3/2008 |
| JP | 2009-205576 | 9/2009 |
| JP | 2009-205576 A | 9/2009 |
| JP | 2009-211357 | 9/2009 |
| JP | 2009-211357 A | 9/2009 |
| JP | 2010-146158 A | 7/2010 |
| JP | 2010-152706 A | 7/2010 |
| WO | WO 2004/111919 A1 | 12/2004 |
| WO | WO 2007/089172 A1 | 8/2007 |

OTHER PUBLICATIONS

Examination Report for counterpart Australian Application No. 2016250489, dated Nov. 16, 2016, pp. 1-3.
Examination Report for counterpart EPO Application No. 12151317.0, dated May 12, 2014, pp. 1-6.
Examination Report for counterpart EPO Application No. 12151317.0, dated Jun. 21, 2016, pp. 1-5.
Summons for Oral Proceedings for counterpart EPO Application No. 12151317.0, dated Oct. 13, 2017, pp. 1-8.
Examination Report for counterpart Canadian Application No. 2,764,773, dated May 2, 2017, pp. 1-4.
Examination Report for counterpart Australian Application No. 2016250492, dated Nov. 15, 2016, pp. 1-3.
Drian Pocovnicu, "Biometric Security for Cell Phones," Informatica Economica vol. 13, No. Jan. 2009, pp. 57-63.
Massimo Tistarelli et al., Advances in Pattern Recognition, 2009, the Forward section and pp. 3-7, Springer-Verlag, London.
Examination Report for related Canadian Application No. 2,764,773, dated Apr. 23, 2019, pp. 1-5.
Xiang-Quin et al. "Fusion of Multiple Features for Palmprint Authentication," Machine Learning and Cybernetics, 2006 International Conference on, Aug. 13-16, 2006, p. 3260.
Amit Jain et al.:"A Multiscale Representation Including Opponent Color Features for Texture Recognition," IEEE Trans. on Image Pro., vol. 7, No. 1, Jan. 1998, pp. 124-128.
Dennis Dunn et al.:"Optimal Gabor Filters for Texture Segmentation," IEEE Transactions on Image processing, vol. 4, No. 7, Jul. 1995, pp. 947-964.
Extended European Search Report for EPO Application No. 12151316.2, dated May 22, 2012, pp. 1-12.
Zheng Liu et al.:"Using multiple orientational filters of steerable pyramid for image registration," vol. 3, No. 3, Sep. 1, 2002, pp. 203-214.
Bernd Jahne et al.:"Principles of Filter Design" In: Handbook of Computer Visions and Applications, vol. 2, Jul. 1, 1999, pp. 125-151.
Extended European Search Report for EPO Application No. 12151317.0, dated May 14, 2012, pp. 1-11.
Barbara Zitova et al. "Image registration methods: a survey," Image and Vision Computing Jun. 21, 2003, pp. 977-1000.
Summons to attend Oral Proceedings for EPO Application No. 12151316.2, dated Oct. 17, 2017, pp. 1-11.
Canadian Office Action for Application No. 2,764,773, dated Oct. 30, 2018, pp. 1-4.
Extended European Search Report for related EPO Application No. 12151319.6, dated May 14, 2012, pp. 1-10.
Kumar, "Incorporating Cohort Information for Reliable Palmprint Authentication," IEEE Computer Society, Dec. 16, 2008, pp. 583-590.
Duta et al., "Matching of palmprints," Pattern Recognition Letters, Elsevier, vol. 23, No. 4, Feb. 1, 2002, pp. 477-485.
Pang et al., "Personal Authenticator on the Basis of Two-Factors: Palmprint Features and Tokenized Random Data," Advances in AI., vol. 3339, Dec. 4, 2004, pp. 227-236.
Burduk, "Probability Error in Bayes Optimal Classifier with Intuitionistic Fuzzy Observations," Image Analysis and Recognition,Springer Berlin Heidelberg,Jul. 6, 2009, pp. 359-368.
Doublet, "Robust GrayScale Distribution Estimation for Contactless Palmprint Recognition," Biometrics: Theory, Applications, & Systems, 1st IEEE Conf. Sep. 1, 2007, pp. 1-6.
Examination Report for related EPO Application No. 12151319.6, dated May 12, 2014, pp. 1-8.
Examination Report for related EPO Application No. 12151319.6, dated Jun. 20, 2016, pp. 1-6.
Examination Report for related EPO Application No. 12151319.6, dated Mar. 6, 2018, pp. 1-5.
Examination Report for related Australian Application No. 2012200238, dated Jul. 22, 2015, pp. 1-3.
Examination Report for related Canadian Application No. 2,764,855, dated Nov. 2, 2017, pp. 1-4.
Examination Report for related EPO Application No. 12151316.2, dated Jun. 20, 2016, pp. 1-7.
Srinivasa et al., "An FFT-Based Technique for Translation, Rotation, and Scale-Invariant Image Registration," IEEE Trans on Image Processing,vol. 5,No. 8,Aug. 1, 1996,pp. 1266-1271.
Examination Report for related EPO Application No. 12151316.2, dated May 12, 2014, pp. 1-5.

(56) References Cited

OTHER PUBLICATIONS

Examination Report for related Canadian Application No. 2,764,736, dated Oct. 24, 2017, pp. 1-4.
Examination Report for related Australian Application No. 2012200239, dated Oct. 17, 2014, pp. 1-4.
Examination Report for related Australian Application No. 2016201334, dated Jul. 5, 2017, pp. 1-4.
Examination Report for counterpart Canadian Application No. 2,764,773, dated Jul. 4, 2017, pp. 1-5.
Examination Report for counterpart Australian Application No. 2012200236, dated Oct. 23, 2014, pp. 1-3.
Examination Report for counterpart Australian Application No. 2012200236, dated Dec. 4, 2015, pp. 1-4.
Amit Jain et al.:"Fingerprint Matching," Computer, vol. 43, Issue 2, pp. 36-44, 2010.
Examination Report for related Australian Application No. 2017202906, dated Jul. 9, 2018, pp. 1-4.
Examination Report for related Australian Application No. 2017202906, dated Apr. 28, 2018, pp. 1-4.
Examination Report for related Canadian Application No. 3,007,376, dated Jul. 6, 2018, pp. 1-4.

METHODS AND SYSTEMS FOR CAPTURING BIOMETRIC DATA

CROSS-REFERENCE TO RELATED APPLICATIONS

This is a continuation application of U.S. patent application Ser. No. 15/898,245, filed Feb. 16, 2018, which is a continuation application of Ser. No. 15/591,650, filed May 10, 2017, now U.S. Pat. No. 9,990,528, issued Jun. 5, 2018, which is a continuation application of Ser. No. 15/344,019, filed Nov. 4, 2016, now U.S. Pat. No. 9,679,193, issued Jun. 13, 2017, which is a continuation application of Ser. No. 15/190,971 filed Jun. 23, 2016, now U.S. Pat. No. 9,519,818, issued Dec. 13, 2016, which is a continuation application of Ser. No. 15/047,869, filed Feb. 19, 2016, now U.S. Pat. No. 9,400,915, issued Jul. 26, 2016, which is a continuation application of U.S. patent application Ser. No. 14/848,464, filed Sep. 9, 2015, now U.S. Pat. No. 9,298,999, issued Mar. 29, 2016, which is a continuation application of U.S. patent application Ser. No. 14/825,507, filed Aug. 13, 2015, now U.S. Pat. No. 9,202,102, issued Dec. 1, 2015, which is a continuation application of U.S. patent application Ser. No. 14/013,611, filed Aug. 29, 2013, now U.S. Pat. No. 9,112,858, issued Aug. 18, 2015, which is a continuation application of U.S. patent application Ser. No. 13/025,729, filed Feb. 11, 2011, now U.S. Pat. No. 8,548,206, issued Oct. 1, 2013, which is a continuation-in-part application of U.S. patent application Ser. No. 13/010,443, filed Jan. 20, 2011, now U.S. Pat. No. 8,457,370, issued Jun. 4, 2013, the disclosures of which are incorporated herein by reference.

BACKGROUND OF THE INVENTION

This invention relates generally to methods and systems that facilitate capturing authentication data, and more particularly, to methods and systems of capturing palm biometric data with a portable device during authentication.

Known palm biometric data capture devices typically include a platen and an instrument positioned at a fixed distance from the platen. When a palm is placed on the platen such that the fingers are fully extended and in a known orientation, a high resolution palm image may be captured and the size of the palm accurately determined.

However, known palm biometric data capture devices are generally large and cumbersome. Thus, known palm biometric data capture devices are not typically portable. Moreover, such devices are not known to be readily available to the general public, thus, accessing such devices is inconvenient and time consuming for members of the general public. Furthermore, such devices have been known to be expensive. Additionally, because known devices require palm placement on the platen in a known orientation and at a known distance from the capture sensor, palm biometric data is not captured from a hand positioned freely in space.

Capturing palm biometric data for authentication with a device from a hand positioned freely in space has been known to be difficult because, due to folds and curves in the palm, palm biometric data captured at different times may present widely varying sets of palm features. Moreover, it has been observed that palm biometric data captured from a hand positioned freely in space, with a device, is generally captured at different orientations and at different angles relative to the device. Thus, it has been known that palm biometric data captured from a hand positioned freely in space is not typically reliable biometric data that may be used for accurate authentication.

BRIEF DESCRIPTION OF THE INVENTION

In one aspect, a method of capturing biometric data is provided that includes activating a security application in a device. The security application is activated by an operator of the device and is configured to cause the device to display an outline image. Moreover, the method includes displaying the outline image in a stationary position on a display of the device, positioning desired biometric data proximate the device such that the desired biometric data appears as a biometric image on the device display, and monitoring the outline and biometric images shown on the device display. Furthermore, the method includes positioning the device and the desired biometric data to better align the outline and biometric images when the outline and biometric images do not align and capturing the desired biometric data from an individual after approximately aligning the outline image with the biometric image.

In another aspect, a system for capturing biometric data is provided that includes an authentication system including an authentication database. The authentication system is configured to at least communicate with devices, store biometric data in the authentication data base, and generate an outline image for an individual from biometric data captured from the individual. Moreover, the system includes a device that includes at least a display. The device is configured to communicate with at least the authentication system, display the outline image and an image of desired biometric data on the device display during authentication of the individual, and capture biometric data from the individual when the image of the desired biometric data aligns approximately with the outline image on the device display.

In yet another aspect, a method of capturing palm biometric data with a portable device during authentication is provided. The method includes activating, by an operator of the portable device, a security application in the portable device. The security application is configured to cause the portable device to at least display an outline image of a palm. Moreover, the method includes displaying the outline image in a display of the portable device, and positioning the palm of an individual proximate the portable device such that an image of the palm appears in the display. Furthermore, the method includes positioning the portable device and the palm to better align the outline image and the palm image when the outline and palm images do not align, and photographing the palm when the outline image and palm image are in alignment.

DETAILED DESCRIPTION OF THE INVENTION

Figure 1:
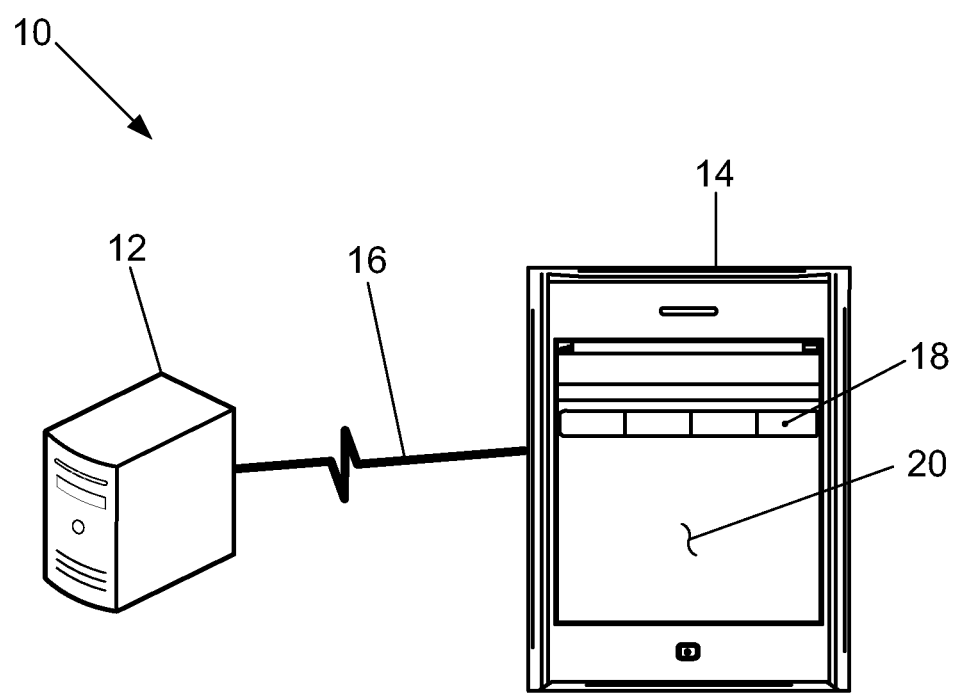
FIG. 1 is a block diagram of an exemplary embodiment of an Authentication Computer (AC) System for authenticating users.

FIG. 1 is an expanded block diagram of an exemplary embodiment of a system architecture of an Authentication Computer (AC) System 10 for authenticating the identity of a user. More specifically, the AC system 10 includes a Biometric Authentication Computer (BAC) System 12 and a device 14.

The BAC system 12 includes components such as, but not limited to, a web server, a disk storage device, a database management server and an authentication server arranged to be combined into a single structure. Although these components are combined into a single structure in the exemplary embodiment, it should be appreciated that in other embodiments these components may be separately positioned at different locations and operatively coupled together in a network such as, but not limited to, a local area network (LAN), a wide area network (WAN) and the Internet. The disk storage device may be used for storing any kind of data including, but not limited to, biometric data, results of filtering analyses, scale factors, coordinates and correlation factors. The database management server may be used to facilitate transferring data to and from the disk storage device. The authentication server is configured to at least perform matching of any feature or information associated with individuals to authenticate the identity of individuals as described herein.

The BAC system 12 is configured to wirelessly communicate with the device 14 over a communications network 16 in the exemplary embodiment. Moreover, the BAC system 12 is operable to communicate with other computer systems (not shown) over a network (not shown) such as, but not limited to, a local area network (LAN), a wide area network (WAN) and the Internet. In the exemplary embodiment, the communications network 16 is a 3G communications network. However, it should be appreciated that in other embodiments the communications network 16 may be any network that facilitates authentication as described herein, such as, but not limited to, Wi-Fi, Global System for Mobile Communications (GSM), General Packet Radio Service (GPRS), Enhanced Data for GSM Environment (EDGE), a LAN, a WAN and the Internet.

The BAC system 12 is also operable to store biometric data and to use the biometric data to conduct authentication matching transactions. Specifically, in the exemplary embodiment, biometric data that may be used as the basis of authentication is captured from individuals during enrollment and is stored in the BAC system 12. The biometric data may take any form such as, but not limited to, images, photographs, templates and electronic data representations. Using biometrics as the basis for authentication facilitates enhancing trust in authentication matching transaction results.

The BAC system 12 stores the biometric data of each individual captured during enrollment in respective enrollment data records. The captured biometric data corresponds to a biometric modality desired to be used for conducting authentication transactions. In the exemplary embodiment, the desired biometric modality is the palm of a right hand. However, in other embodiments the palm biometric data may be from the left hand. In yet other embodiments the biometric data desired for conducting authentication transactions may correspond to any other biometric modality that facilitates authentication as described herein. Such other biometric modalities include, but are not limited to, hand geometry, foot, face, iris, vascular patterns and hand signatures.

The captured biometric data for each individual is processed during enrollment to generate an enrollment biometric template, for each respective individual, which is used by the BAC system 12 to conduct authentication matching transactions. In the exemplary embodiment, each enrollment data record includes at least the captured biometric data and the enrollment biometric template of a respective individual. Moreover, an outline image is generated for each individual and included in the respective enrollment data record. In other embodiments each enrollment data record may also include any kind of data that may be used in authentication. Such data includes, but is not limited to, biographic data, biometric data for biometric modalities different than the biometric modality desired for conducting authentication transactions, and any combination of biometric modality data. The term "biographic data" as used herein includes any demographic information regarding an individual such as, but not limited to, an individual's name, age, date of birth, address, citizenship and marital status.

In the exemplary embodiment, biometric features are extracted from the captured biometric data by the BAC system 12 and are included as data in the enrollment biometric template generated by the BAC system 12. The enrollment biometric templates are a compact representation of the biometric features included in the captured biometric data, and are used for authenticating individuals. Although captured biometric data for each individual is stored in the BAC system 12 in the exemplary embodiment, in other embodiments the captured biometric data may be stored in a server system different than the BAC system 12.

Although the biometric data is captured from individuals during enrollment in the BAC system 12, it should be appreciated that in other embodiments the biometric data may be obtained by any other method including, but not limited to, automatically reading or extracting the biometric data from identity documents or from legacy data bases included in other computer systems. Likewise, biometric templates and outline images corresponding to the biometric data may be obtained by any method including, but not limited to, automatically reading or extracting the biometric templates and outline images from identity documents or from legacy data bases included in other computer systems. It should be understood that biometric templates and outline images corresponding to desired biometric data may be obtained in addition to, or instead of, the desired biometric data. Such other legacy database systems include, but are not limited to, systems associated with motor vehicle administrations, social security administrations, welfare system administrations, financial institutions and health care providers. Such identity documents include, but are not limited to, passports and driver's licenses. It should be appreciated that by extracting desired biometric data, or biometric templates and outline images, from a legacy database or identity document, and storing the extracted data in the BAC system 12, individuals may be enrolled therein without having to provide biometric data.

The BAC system 12 also stores authentication policies therein which are used to determine data that is to be captured or obtained from an individual attempting to enroll in the BAC system 12. Moreover, additional authentication policies may be stored in the BAC system 12 that determine data to be captured from an individual requesting biometric authentication. The BAC system 12 is also operable to at least process biometric data into an outline image, and determine transformations, scale factors, coordinates, and correlation factors.

The device 14 includes at least one of buttons and icons 18 operable to at least enter commands, enter data and invoke applications stored therein. Moreover, the device 14 includes a display screen 20 such as, but not limited to, a Liquid Crystal Display (LCD), and is operable to display any text or image on the display screen 20. In the exemplary embodiment, the device 14 is a smart phone operable to at least display messages and images, capture biometric data, process captured biometric data into an outline image, and transmit the captured biometric data and outline image to the BAC system 12. By virtue of being a smart phone the device 14 is portable in the exemplary embodiment. However, in other embodiments the device 14 may not be portable.

Although the device 14 is a smart phone in the exemplary embodiment, it should be appreciated that in other embodiments the device 14 may be any device capable of at least communicating with the BAC system 12, displaying messages and images, and capturing and processing biometric data, and transmitting data. Such other devices 14 include, but are not limited to, a tablet computer, a television, a camera, a personal desktop computer, a laptop computer, and a personal digital assistant (PDA). Since each of the listed devices may communicate with other devices, the device 14 may also be described as a communications device.

The device 14 is configured to wirelessly communicate with at least the BAC system 12 over the network 16. Moreover, in the exemplary embodiment the device 14 is used to capture biometric data from individuals. Specifically, a security application is stored in the device 14 that facilitates capturing biometric data with the device 14 during enrollment and authentication. When an individual decides to capture biometric data, the security application is invoked by activating a button or icon 18. It should be understood that an operator may invoke the security application and otherwise operate the device 14 during enrollment and authentication. The operator may be the individual offering biometric data for capture during enrollment or authentication, or may be a user different than the individual. After invoking the security application during enrollment, the security application causes the device 14 to display a biometric data capture request message in the display screen 20 prompting the user to capture desired biometric data. After biometric data in accordance with the capture request message is captured with the device 14, the security application causes the device 14 to transmit the captured biometric data to the BAC system 12. In the exemplary embodiment the security application also causes the device 14 to display outline images. In other embodiments after capturing the desired biometric data with the device 14, the security application may cause the device 14 to process the captured biometric data into an outline image and transmit both the captured biometric data and outline image to the BAC system 12.

The memories (not shown) in the BAC 12 and the device 14 can be implemented using any appropriate combination of alterable, volatile or non-volatile memory or non-alterable, or fixed, memory. The alterable memory, whether volatile or non-volatile, can be implemented using any one or more of static or dynamic RAM (Random Access Memory), a floppy disc and disc drive, a writeable or re-writeable optical disc and disc drive, a hard drive, flash memory or the like. Similarly, the non-alterable or fixed memory can be implemented using any one or more of ROM (Read-Only Memory), PROM (Programmable Read-Only Memory), EPROM (Erasable Programmable Read-Only Memory), EEPROM (Electrically Erasable Programmable Read-Only Memory), an optical ROM disc, such as a CD-ROM or DVD-ROM disc, and disc drive or the like.

Each memory (not shown) can be a computer-readable recording medium used to store data in the BAC system 12 and the device 14, and store computer programs, applications, or executable instructions that are executed by the BAC system 12 and the device 14. Moreover, the memory (not shown) may include smart cards, SIMs or any other medium from which a computing device can read computer programs or executable instructions. As used herein, the terms "computer program" and "application" are intended to encompass an executable program that exists permanently or temporarily on any computer-readable recordable medium that causes the computer or computer processor to execute the program. The BAC system 12 and the device 14, respectively, each include a processor (not shown) and a memory (not shown). It should be understood that, as used herein, the term processor is not limited to just those integrated circuits referred to in the art as a processor, but broadly refers to a computer, an application specific integrated circuit, and any other programmable circuit. It should be understood that the processors execute instructions, or computer programs, stored in the respective memories (not shown) of the BAC system 12 and the device 14. The above examples are exemplary only, and are thus not intended to limit in any way the definition and/or meaning of the term "processor."

Figure 2:
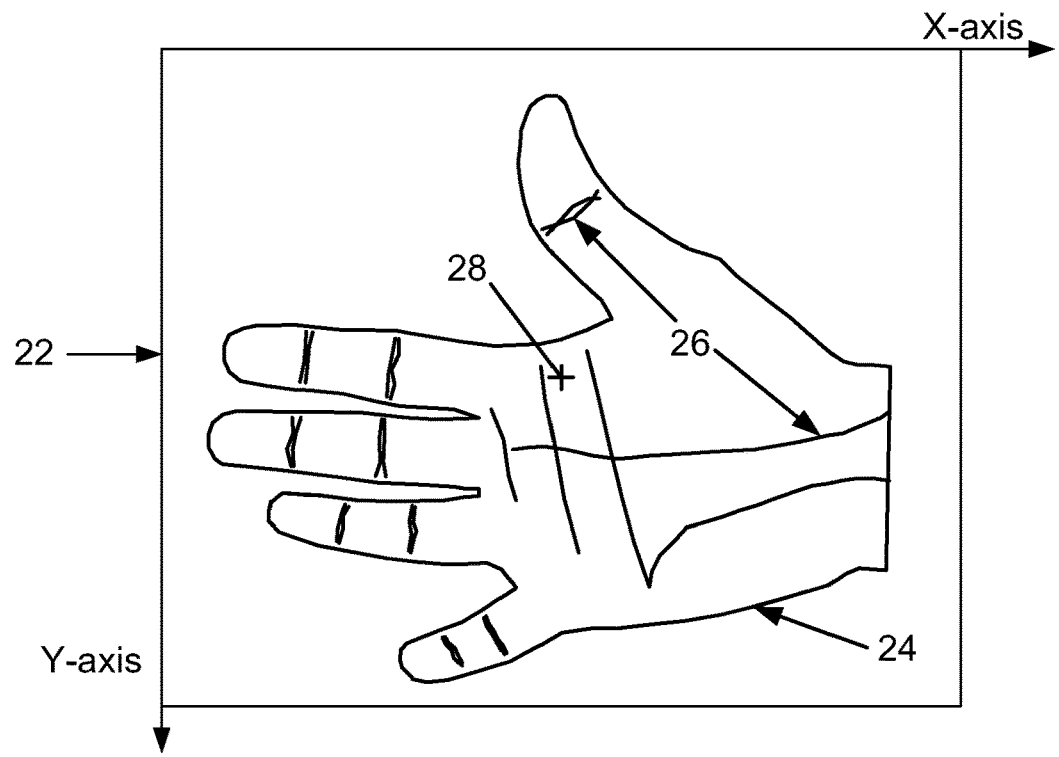
FIG. 2 is a plan view of an exemplary hand image captured during enrollment.

FIG. 2 is a plan view of an exemplary enrollment hand image 22 captured with the device 14 during enrollment in the BAC system 12. The enrollment hand image 22 includes a right hand 24 that includes biometric features 26 which in the exemplary embodiment are lines and wrinkles. However, in other embodiments the biometric features 26 may be any biometric feature including, but not limited to, ridge lines. It should be understood that the enrollment hand image 22 is rectangular-shaped, includes a center point 28, is digital, and is positioned on a first Cartesian coordinate system that includes an X-axis and a Y-axis.

It should be understood that digital images include an array of pixels and that each pixel occupies a position within the array. Thus, the position of each pixel within a digital image positioned on a Cartesian coordinate system is determined by the coordinates of the Cartesian coordinate system. Because the enrollment hand image 22 is digital and is positioned on the first Cartesian coordinate system, the positions of pixels within the enrollment hand image 22 are defined by the first Cartesian coordinate system.

Figure 3:
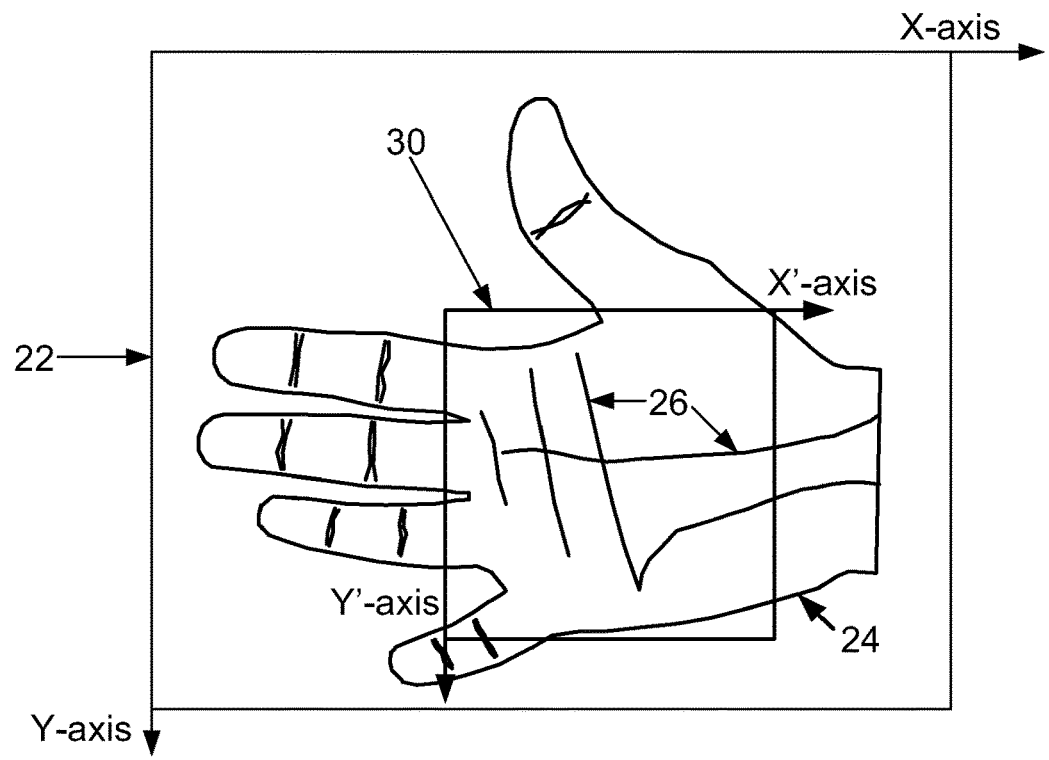
FIG. 3 is the plan view of the exemplary hand image as shown in FIG. 2, further including an enrollment region of interest.

FIG. 3 is the plan view of the exemplary enrollment hand image 22 as shown in FIG. 2, further including an enrollment region of interest 30 positioned mostly on the palm area of the hand 24. In the exemplary embodiment, the enrollment region of interest 30 is square-shaped. However, in other embodiments the enrollment region of interest 30 may have any shape including, but not limited to, rectangle and circle. The enrollment region of interest 30 is positioned on a second Cartesian coordinate system that includes an X'-axis and a Y'-axis. The enrollment region of interest 30 defines part of biometric data captured during enrollment that is to be included in an enrollment biometric template for use during authentication. Because the region of interest 30 is positioned on the hand 24 to include mostly the palm portion of the hand 24, palm biometric data is to be used for authentication in the exemplary embodiment.

Figure 4:
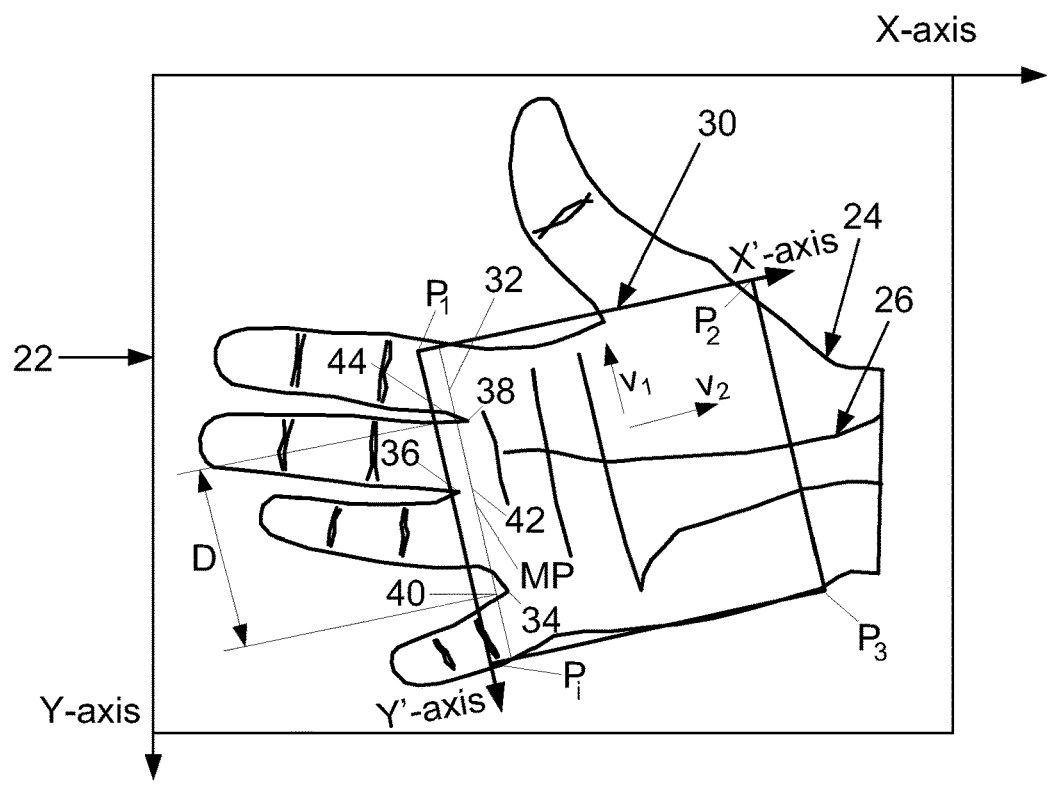
FIG. 4 is the plan view of the exemplary hand image as shown in FIG. 3, further including a best fit line.

FIG. 4 is the plan view of the enrollment hand image 22 as shown in FIG. 3, further including a best fit line 32 for use in constructing the enrollment region of interest 30. In the exemplary embodiment, the enrollment region of interest 30 is constructed by first calculating coordinates of points 34, 36, 38 in accordance with the first Cartesian system. Points 34, 36, 38 are each positioned at the base between different fingers. Next, constructing the enrollment region of interest 30 continues by determining the line 32 that constitutes a best fit between points 34, 36, 38, and determining a normal projection from each point 34, 36, 38 to the best fit line 32. Each normal projection intersects the best fit line 32 to define further points 40, 42, 44, respectively. The coordinates of points 40, 42, 44 are calculated in accordance with the first Cartesian coordinate system. A distance D is determined between points 40 and 44 that may be referred to as a scale identifying number or a scale factor. Next, the coordinates of a midpoint MP between points 40 and 44 are calculated in accordance with the first Cartesian coordinate system, and a vector $v_1$ parallel to the best fit line 32 and a vector $v_2$ normal to the best fit line 32 are determined. The scale identifying number D, the coordinates of the midpoint MP, and the vectors $v_1$ and $v_2$ are then substituted into an equation $P_i = MP + a_1 Dv_1 + b_1 Dv_2$ to calculate the coordinates of each corner of the region of interest 30. The designation "i" as used in conjunction with the corner points $P_i$, is intended to indicate that any number "i" of corner points, appropriate for any geometric shape, may be used that facilitates authentication as described herein. It should be appreciated that $a_1$ and $b_1$ designate coefficients that facilitate calculating the coordinates of corner points $P_i$. By virtue of determining the coordinates of points $P_i$, in accordance with the first Cartesian coordinate system, it should be appreciated that the enrollment region of interest 30 is defined.

Although the exemplary embodiment determines the enrollment region of interest 30 by calculating the coordinates of each corner using an equation, it should be appreciated that differently shaped enrollment regions of interest 30 may be determined using other methods, equations or mathematical relationships.

Figure 5:
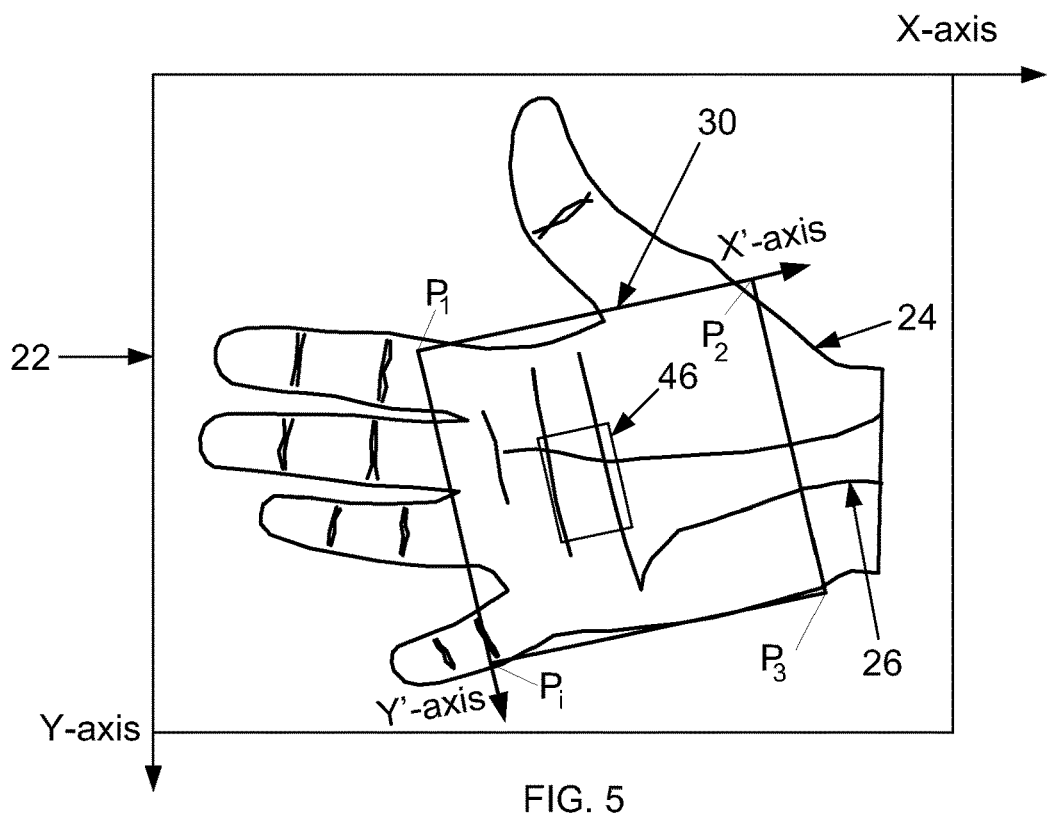
FIG. 5 is the plan view of the exemplary hand image as shown in FIG. 3, further including a patch area.

FIG. 5 is the plan view of the exemplary enrollment hand image 22 as shown in FIG. 3, further including a patch area 46. In the exemplary embodiment, the patch area 46 is rectangular-shaped, has a fixed size that is smaller than the enrollment region of interest 30, and is positioned at a center of gravity of the hand 24. It should be understood that the patch area 46 is not merely a rectangular geometric shape superimposed on the hand 24. Rather, the patch area 46 represents a copy of a portion of the enrollment hand image 22 within the bounds of the patch area 46. The coordinates of the center of gravity of the hand are calculated in accordance with the second Cartesian coordinate system. Next, the center of the patch area 46 is positioned to be coincident with the center of gravity. Thus, after positioning the center of the patch area 46 on the center of gravity, the center of the patch area 46 has the same coordinates as the center of gravity of the hand 24. In the exemplary embodiment sides of the patch area 46 are parallel to the sides of the enrollment region of interest 30. However, in other embodiments it is not necessary that the sides of the patch area 46 be parallel to the sides of the enrollment region of interest 30.

It should be understood that the position of the enrollment region of interest 30 and the position of the patch area 46 are not related. However, the patch area 46 is to be positioned completely within the enrollment region of interest 30. Although the patch area is rectangular-shaped in the exemplary embodiment, in other embodiments the patch area 46 may be any shape including, but not limited to, square and circle. Moreover, in other embodiments instead of positioning the center of the patch area 46 coincident with the center of gravity of the hand 24, the patch area 46 may be positioned at areas on the hand 24 within the enrollment region of interest 30 that have a higher density of biometric features than other areas. A biometric template of the patch area 46 and an enrollment biometric template of the portion of hand 24 within the enrollment region of interest 30 are generated by the BAC system 12 and stored therein. Because the region of interest 30 is positioned on the hand 24 to include mostly the palm portion of the hand 24, by thus generating the enrollment biometric template palm biometric data is considered to have been captured such that biometric authentication based on palm biometric data may be conducted.

Figure 6:
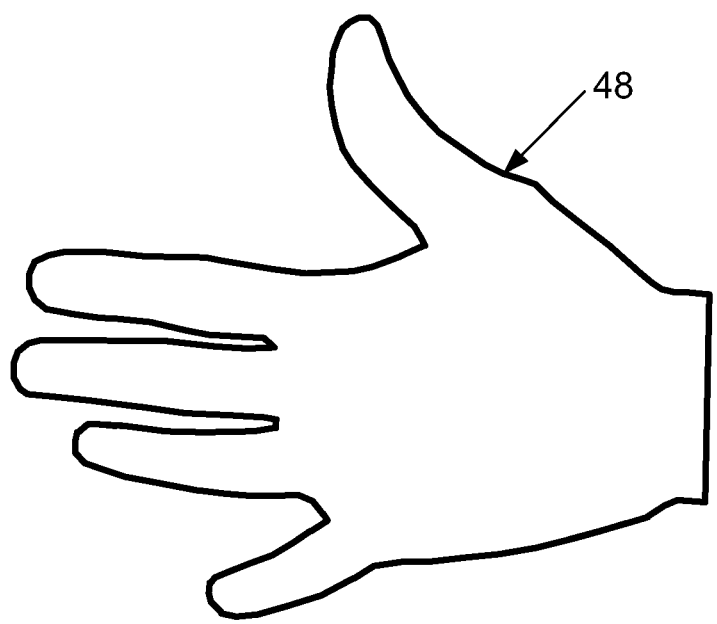
FIG. 6 is a plan view of an exemplary outline image of a hand.

FIG. 6 is a plan view of an exemplary outline image 48 of the hand 24 that is generated by the BAC system 12 from the enrollment hand image 22 in the exemplary embodiment. However, in other embodiments the outline image 48 may be generated by the device 14.

Figure 7:
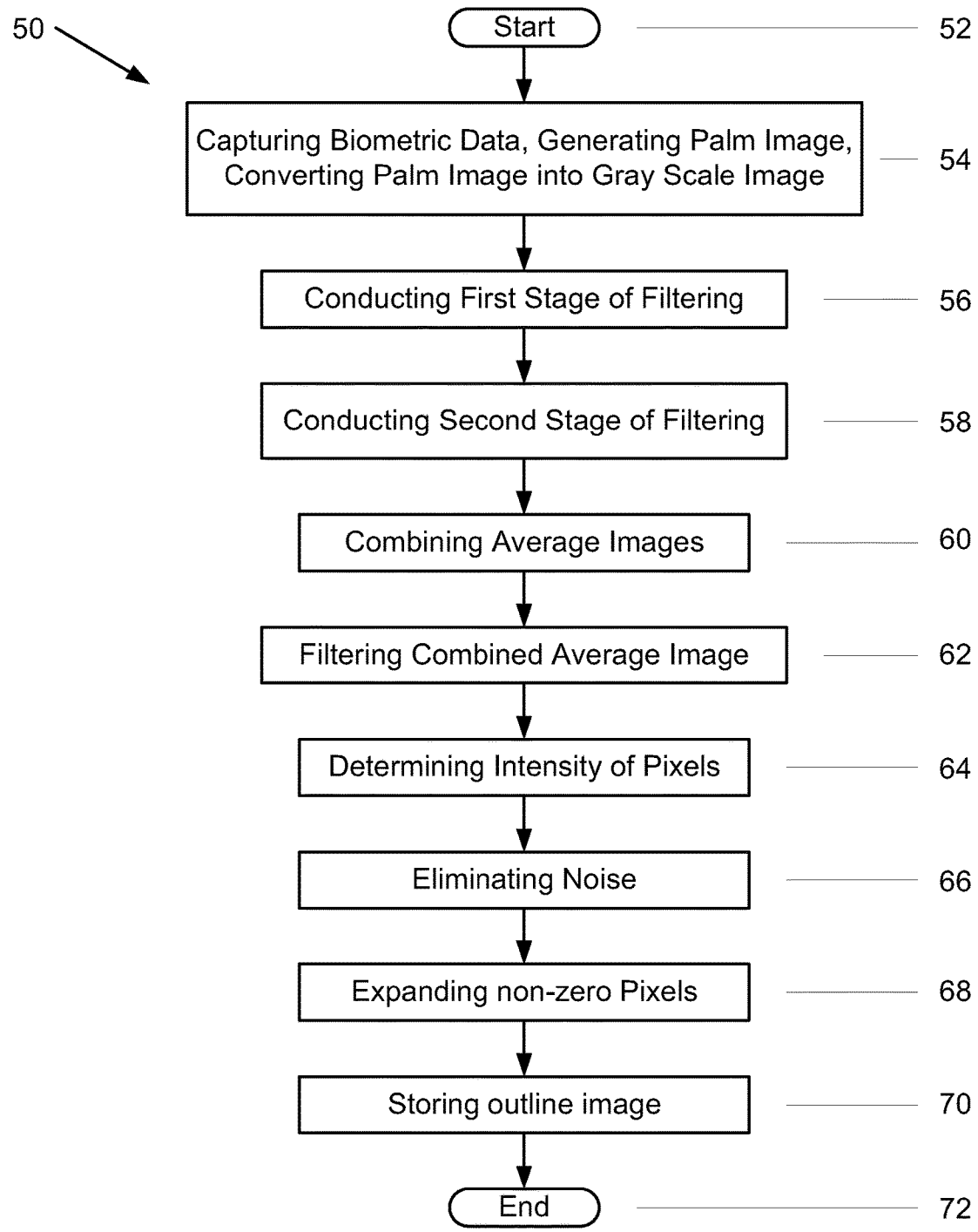
FIG. 7 is a flowchart illustrating an exemplary process for generating an outline image.

FIG. 7 is a flowchart 50 illustrating an exemplary process for generating the outline image 48 from the enrollment hand image 22 during enrollment in the BAC system 12. Specifically, the generating process starts 52 by capturing desired biometric data 54 from an enrolling individual with the device 14 and transmitting the captured biometric data to the BAC system 12. In the exemplary embodiment, the desired biometric data is the palm side of the right hand. The BAC system 12 continues processing by generating 54 the enrollment hand image 22 from the captured hand biometric data, and converting the enrollment hand image 22 into a gray scale hand image.

Next, processing continues by conducting a first stage of filtering 56. Specifically, processing continues by filtering the gray scale hand image with a first filter and with a second filter. As a result, the first filter generates a first digital image and the second filter generates a second digital image. Next, processing continues by determining an average image of the first and second images which is referred to herein as a first average image. Because the first and second images are digital images, the first average image is also a digital image.

Next, processing continues by conducting a second stage of filtering 58. Specifically, processing continues by rotating the gray scale hand image about the center point 28 clockwise by forty-five degrees and filtering the rotated gray scale hand image with the first filter and with the second filter. As a result, the first filter generates a first rotated digital image and the second filter generates a second rotated digital image. Processing continues by determining an average image of the first and second rotated images which is referred to herein as a second average image. Because the first and second rotated images are rotated digital images of the gray scale hand image, the second average image is also a rotated digital image of the gray scale hand image. In the exemplary embodiment, the first and second filters are different Sobel filters. However, in other embodiments any type of edge detection filter may be used that facilitates generating the outline image 48 as described herein. Moreover, in yet other embodiments any process may be used that facilitates generating the outline image 48 including, but not limited to, conducting statistical color analysis, clustering, and any combination of such processes with each other or in concert with conducting edge detection using edge detection filters.

Next, processing continues by combining the first and second average images 60 to form a combined average digital image. Specifically, processing continues by rotating the second average image about the center point 28 counterclockwise by forty-five degrees and determining the intensity of each pixel included in the first average image and in the second average image. Each pixel in the first average image has a corresponding pixel in the second average image. Corresponding pixels in the first and second average images have the same coordinates and constitute a pair of pixels. Each pair of pixels is compared against a range of intensities that includes a low intensity range, a middle intensity range, and a high intensity range. When at least one of the pixels included in each pair has an intensity in the middle intensity range, a pixel in the combined average image corresponding to each pixel of the pair, is set to a positive non-zero value of 255. Otherwise, the combined average image pixel corresponding to each pixel of the pair is set to zero.

After combining the average images 60 to form the combined average image, processing continues by filtering the combined average image 62 with a smoothing filter. In the exemplary embodiment the smoothing filter is a Gaussian function having a standard deviation of one. However, in other embodiments any filter may be used that facilitates determining the outline image 48 as described herein. A smoothed combined average image is generated as the result of the filtering operation 62. Processing continues by converting the smoothed combined average image into a binary image. Specifically, processing continues by determining the intensity 64 of each pixel in the smoothed combined average image. Each pixel in the smoothed combined average image having an intensity below a mid-point value of 128 is given a value of zero. All other pixels in the smoothed combined average image are given a value of one. By thus giving each pixel in the smoothed combined average image a value of zero or one, the smoothed combined average image is converted into a binary image that represents a preliminary outline image of the right hand 24.

Next, processing continues by eliminating noise 66 from the preliminary outline image. Specifically, processing continues by determining four-connected sets of pixels within the preliminary outline image and determining a population of each four-connected set of pixels. When the population of a four-connected set of pixels is less than a threshold value, each pixel included in the four-connected set of pixels is given a value of zero. Otherwise, when the population of a four-connected set of pixels is at least equal to the threshold value, each pixel value included in the four connected set of pixels remains unchanged.

After eliminating noise 66 from the preliminary outline image, processing continues by expanding each non-zero value pixel 68 included in the preliminary outline image by a predetermined width in both the X and Y directions of the first Cartesian coordinate system. Doing so, facilitates enhancing the visibility of the preliminary outline image and thus results in the outline image 48 of the right hand 24. Processing continues by storing 70 the outline image 48 in the BAC system 12. Next, processing ends 72.

Although the outline image 48 is stored in the BAC system 12 after expanding each non-zero value pixel in the exemplary embodiment, in other embodiments after expanding each non-zero value pixel processing may continue by transmitting the captured biometric data and outline image 48 to the device 14, and displaying the captured biometric data and outline image 48 on the display screen 20. The operator continues processing by reviewing the outline image 48 for correctness and confirms that the outline image 48 is correct by activating a button or icon 18. For example, the operator may confirm that the outline image 48 includes the correct number of fingers. After confirming that the outline image 48 is correct, processing continues by transmitting the captured biometric data and outline image 48 to the BAC system 12 for storage therein. When the outline image 48 is not confirmed as correct, processing may continue by again capturing biometric data at operation 54. Otherwise, processing ends 72.

Although the BAC system 12 generates the outline image 48 in the exemplary embodiment, in other embodiments upon capturing the biometric data, the device 14 may generate the outline image 48 and transmit the outline image 48 and captured biometric data to the BAC system 12. In such other embodiments, upon generating the outline image 48 the device 14 may continue processing by presenting the outline image and captured biometric data on the display screen 20 for review by the operator. After confirming that the outline image is correct, processing may continue by transmitting the captured biometric data and outline image 48 to the BAC system 12 for storage therein. Such other embodiments avoid repeatedly transmitting the captured biometric data and outline image 48 between the BAC system and device 14.

A frequently encountered problem associated with automated biometrics may be location of the biometric data offered for capture. Thus, it should be appreciated that by virtue of confirming that the outline image 48 is correct, the operator may also confirm that a correct location of the biometric data offered for capture has been determined.

Although hand biometric data is captured during enrollment in the BAC system 12 without using an outline image in the exemplary embodiment, it should be appreciated that in other embodiments a generic outline image of an average sized hand may be presented on the display screen 20 to facilitate capturing biometric data and generating the outline image 48 during enrollment. In yet other embodiments, any type of visual aid may be shown on the display screen 20 that would function as a guide for enabling an operator to capture the desired biometric data in accordance with a prescribed manner. Such visual aids include, but are not limited to, circles, lines, curves and marks.

Although the second stage of filtering is conducted by rotating and then filtering the gray scale hand image in the exemplary embodiment, in other embodiments instead of rotating the gray scale image, the first and second filters may be mathematically modified to effect a forty-five degree rotation prior to filtering the gray scale hand image. Applying the mathematically modified first and second filters to the gray scale hand image generates first and second rotated digital images that are about the same as those generated in the exemplary embodiment. Moreover, although the gray scale hand image is rotated by forty-five degrees in the exemplary embodiment, in other embodiments the gray scale hand image may be rotated by any angle that facilitates determining the outline image 48 as described herein. Furthermore, in yet other embodiments the first and second filters may be mathematically modified to effect any degree of rotation that facilitates determining the outline image 48 as described herein.

Although biometric data of the palm side of the right hand is used to generate the outline 48 in the exemplary embodiment, it should be appreciated that in other embodiments biometric data of different biometric modalities may be captured and used to generate the outline image 48. Such different biometric modalities include, but are not limited to, face, iris, and foot. Moreover, it should be appreciated that such different biometric modalities may have biometric features, different than wrinkles and lines that can be extracted from the captured biometric data and included in a biometric template. For example, when iris biometric data is captured during enrollment or authentication, phase information and masking information of the iris may be extracted from the captured iris biometric data and included in a biometric template.

Figure 8:
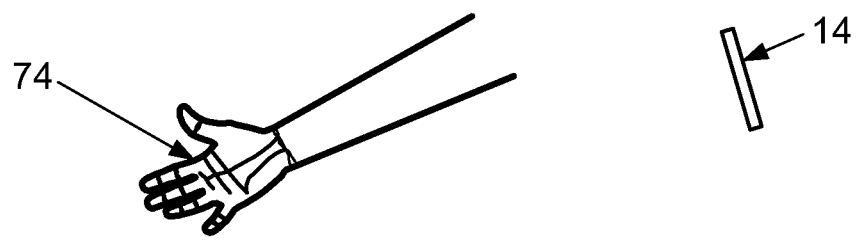
FIG. 8 illustrates capturing biometric data with a device during authentication.

FIG. 8 illustrates capturing biometric data with the device 14 during authentication. Specifically, the palm side of a right hand 74 of an individual desiring to be authenticated is positioned proximate the device 14 such that an image of the hand 74 appears on the display screen 20. It should be understood that the hand 74 is not controllably oriented on a surface in a fixed position. Rather, the individual being authenticated freely positions his hand proximate to, and with respect to, the device 14 such that the image of the hand 74 appears in the display screen 20. The outline image 48 also appears on the display screen 20 during authentication in a stationary position.

Figure 9:
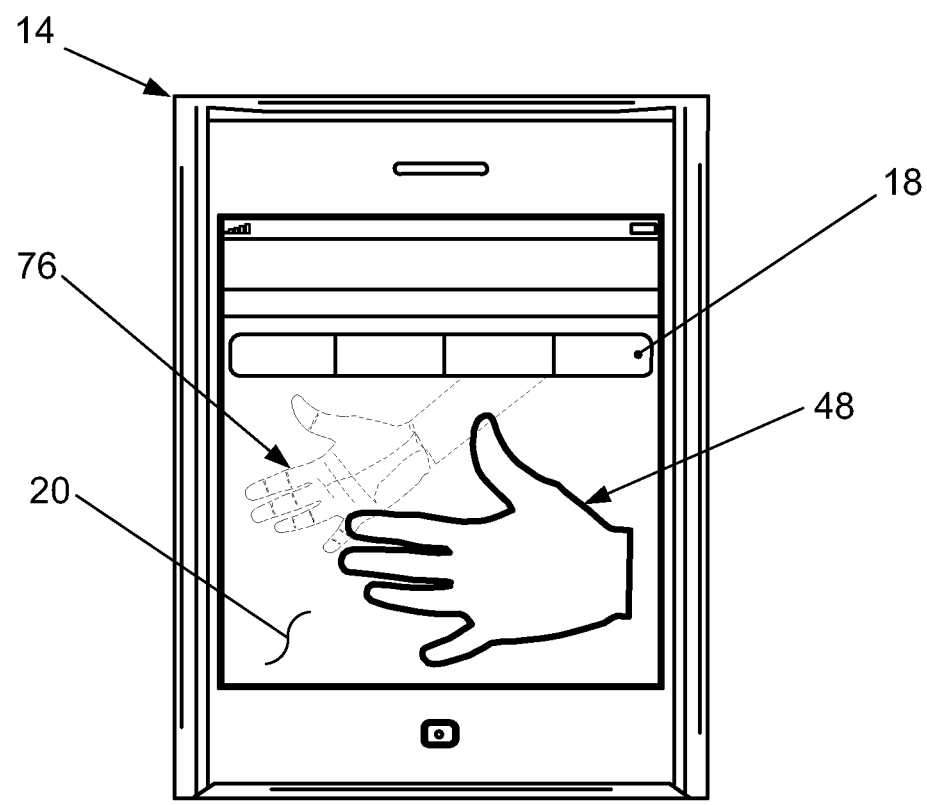
FIG. 9 illustrates the outline image and an initial position of a hand image as shown on a display screen of a device.

FIG. 9 illustrates the outline image 48 and an initial position of an image 76 of the hand 74 as shown on the display screen 20 while capturing biometric data during authentication. The hand image 76 in the initial position does not align with the outline image 48. Consequently, the device 14 and the hand 74 are repositioned with respect to each other such that the hand image 76 shown on the display screen 20 better aligns with the outline image 48 shown on the display screen 20.

Figure 10:
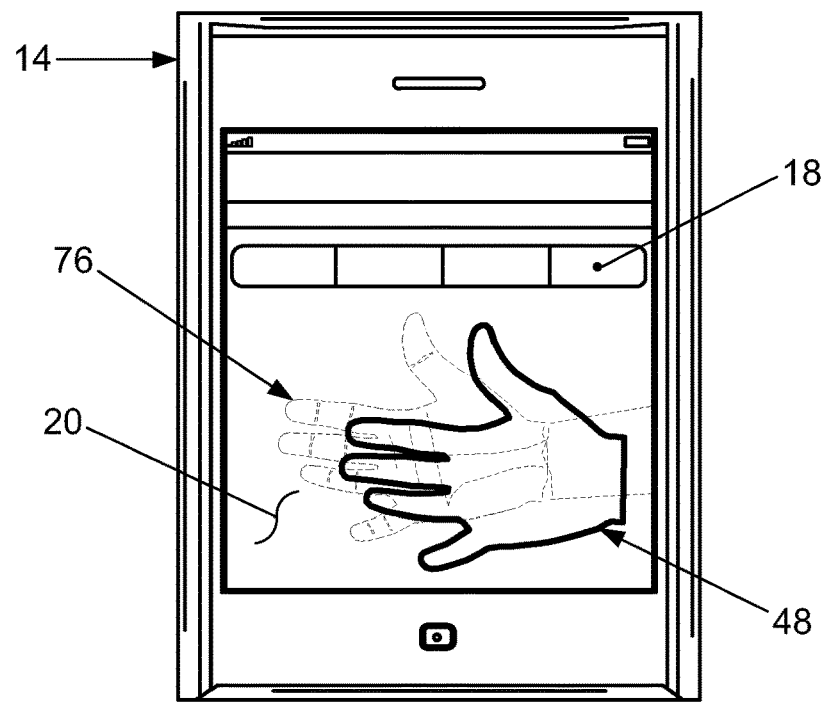
FIG. 10 illustrates the outline image and a subsequent position of the hand image as shown in the display of the device.

FIG. 10 illustrates the outline image 48 and a subsequent position of the hand image 76 as shown on the display screen 20 while capturing biometric data during authentication. After repositioning the device 14 and the hand 74 with respect to each other, the hand image 76 as shown on the display screen 20 has been rotated and translated from the initial position into the subsequent position. However, the subsequent position of the hand image 76 as shown on the display screen 20 does not adequately align with the outline image 48 as shown on the display screen 20. Consequently, the device 14 and the hand 74 are further repositioned with respect to each other such that the hand image 76 as shown on the display screen 20 is better aligned with the outline image 48 shown on the display screen 20.

Figure 11:
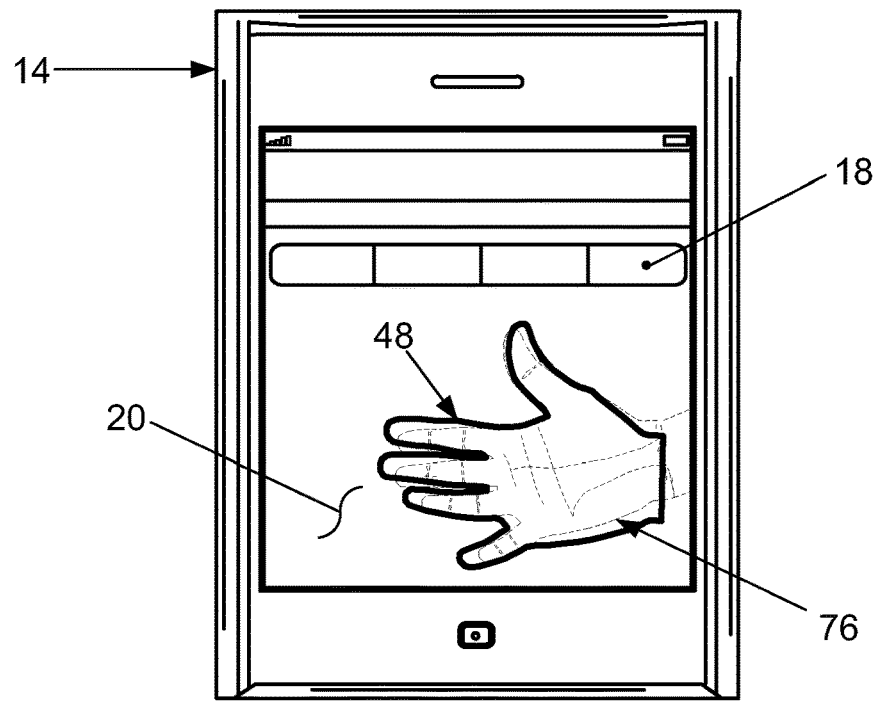
FIG. 11 illustrates the outline image and an aligned position of the hand image as shown in the display of the device.

FIG. 11 illustrates the outline image 48 and an aligned position of the hand image 76 as shown on the display screen 20 while capturing biometric data during authentication. After further repositioning the device 14 and the hand 74 with respect to each other, the hand image 76 has been further rotated and translated from the subsequent position such that the hand image 76 as shown on the display screen 20 approximately aligns with the outline image 48 shown on the display screen 20. When the hand image 76 shown in the display screen 20 approximately aligns with the outline image 48 shown on the display screen 20, the operator captures hand biometric data by photographing the hand 74 with the device 14.

It should be appreciated that because the hand image 76 aligns approximately with the outline image 48 during capture, hand biometric data captured during authentication is typically captured at a different, but similar, orientation as the hand biometric data captured during enrollment in the BAC system 12. Moreover, it should be understood that the size of the of the hand biometric data captured during authentication may typically be different than the size of the hand biometric data captured during enrollment. In the exemplary embodiment, the size of the hand biometric data image captured during authentication is different than the size of the outline image 48. Although the operator photographs the hand 74 with the device 14 in the exemplary embodiment, it should be understood that in other embodiments the security application may cause the device 14 to automatically photograph the hand 74. In such other embodiments, a photograph may be automatically taken when the hand image 76 is within an established tolerance of the outline image 48.

Figure 12:
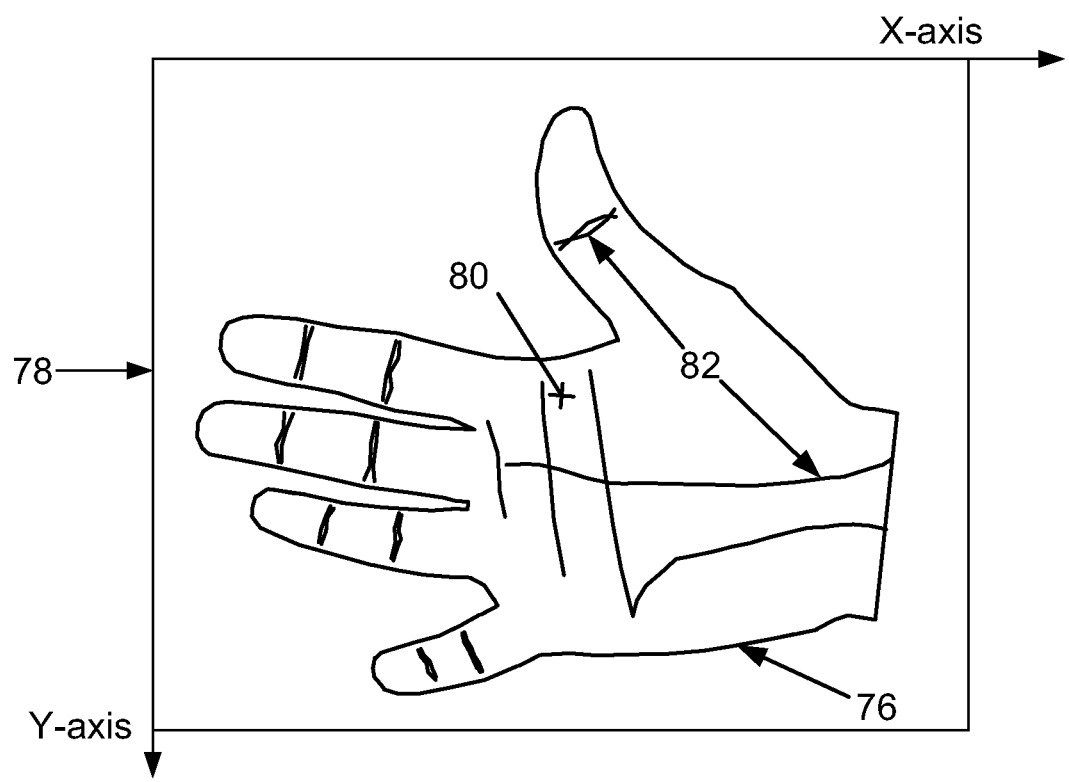
FIG. 12 is a plan view of an exemplary authentication hand image captured by the device.

FIG. 12 is a plan view of an exemplary authentication hand image 78 captured by the device 14 during authentication. The authentication hand image 78 includes a center point 80, the hand image 76, and biometric features 82 included in the hand image 76. The biometric features 82 are lines and wrinkles in the exemplary embodiment. However, in other embodiments the biometric features 82 may be any biometric feature including, but not limited to, ridge lines.

Figure 13:
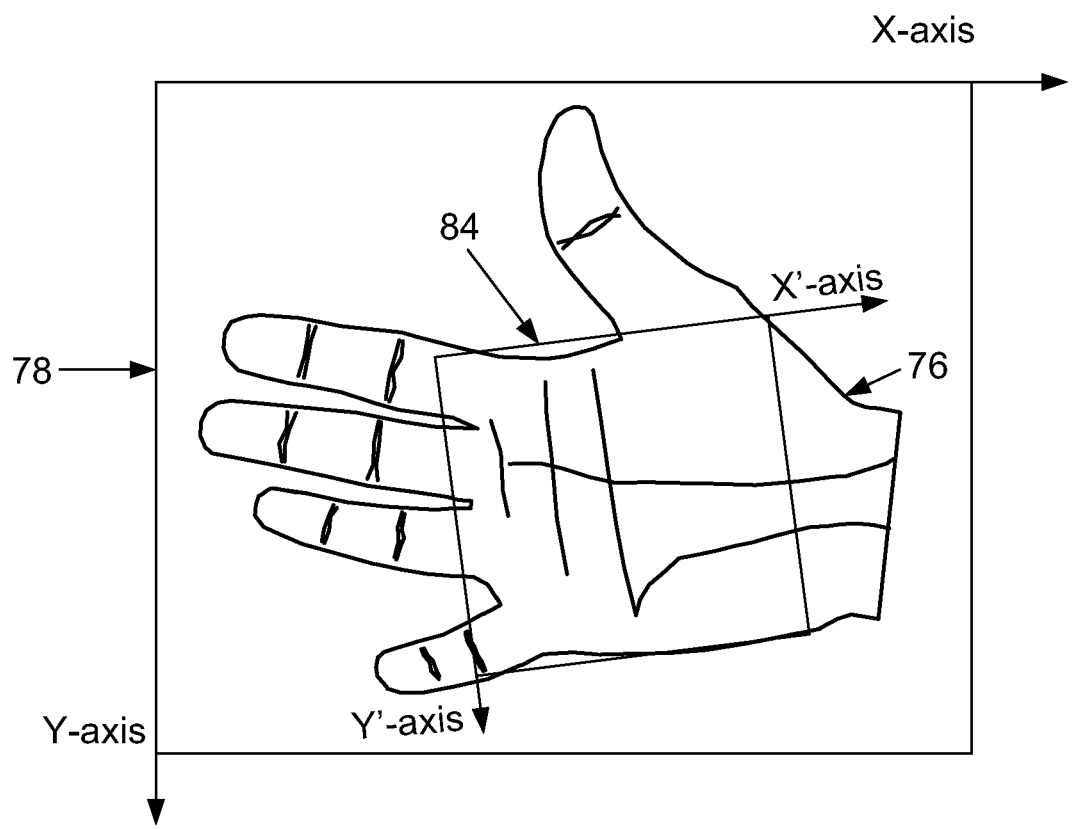
FIG. 13 is a plan view of the exemplary authentication hand image as shown in FIG. 12, further including an authentication region of interest.

FIG. 13 is a plan view of the exemplary authentication hand image 78 as shown in FIG. 12, further including an authentication region of interest 84. The authentication region of interest 84 is determined in a substantially identical way as the enrollment region of interest 30. The authentication region of interest 84 also includes the second Cartesian coordinate system similar to the enrollment region of interest 30. The authentication region of interest 84 defines part of biometric data captured during authentication that is to be used for authentication. Because the authentication region of interest 84 is positioned on the hand image 76 to include mostly the palm portion of the hand image 76, palm biometric data is to be used for authentication in the exemplary embodiment.

In order to facilitate approximately aligning differently oriented and differently sized images of the same biometric modality, during authentication the authentication region of interest 84 is manipulated to be approximately the same as the enrollment region of interest 30. Specifically, the size of the authentication region of interest 84 is increased or decreased by a scale factor such that the size of the authentication region of interest 84 is approximately the same as the size of the enrollment region of interest 30. Furthermore, the authentication region of interest 84 is rotated to have approximately the same orientation as the enrollment region of interest 30. It should be understood that the portion of the hand image 76 within the authentication region of interest 84 is manipulated in concert with the authentication region of interest 84 to have approximately the same size and orientation as the portion of the hand 24 within the enrollment region of interest 30. By thus manipulating the authentication region of interest 84 and the portion of the hand image 76 within the authentication region of interest 84, the portion of the hand image 76 within the authentication region of interest 84 and the portion of the hand 24 within the enrollment region of interest 30 may be approximately aligned with each other such that accurate authentication results may be generated. The authentication region of interest 84 and the enrollment region of interest 30 have the same shape in the exemplary embodiment. After the authentication region of interest 84 is manipulated to have approximately the same size and orientation as the enrollment region of interest 30, a portion of the palm image 76 within the authentication region of interest 84 is converted to a gray scale image.

Although the authentication region of interest 84 is manipulated to have approximately the same size and orientation as the enrollment region of interest 30 in the exemplary embodiment, in other embodiments the enrollment region of interest 30 may be selected to be manipulated in a similar manner to have approximately the same size and orientation as the authentication region of interest 84.

Figure 14:
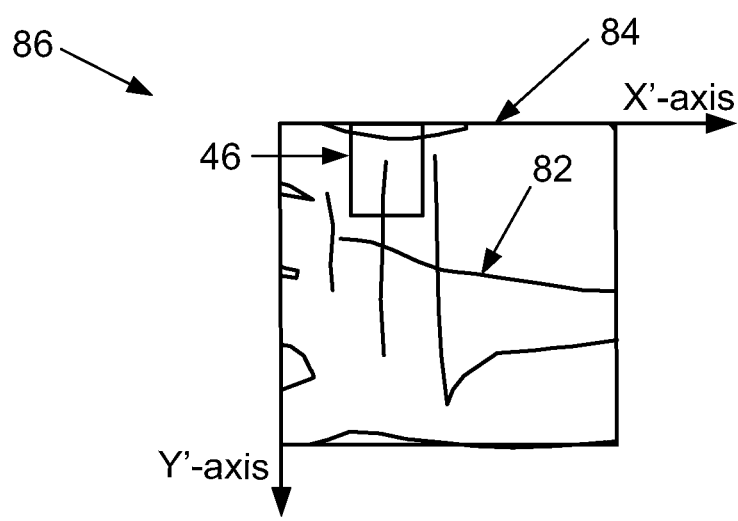
FIG. 14 is a plan view of a gray scale palm image converted from a hand image included in the authentication region of interest.

FIG. 14 is a plan view of a gray scale image 86 converted from the hand image 76 within the authentication region of interest 84. Because the authentication region of interest 84 is positioned on the hand image 76 to include mostly the palm portion of the hand image 76, the gray scale image 86 is also a gray scale image of the palm and is referred to herein as a gray scale palm image 86. The patch area 46 determined during enrollment in the BAC system 12 is used to facilitate determining an optimum area of the gray scale palm image 86 that best correlates to the patch area 46. Specifically, the patch area 46 is incrementally positioned over the entire gray scale palm image 86. In the exemplary embodiment, the patch area 46 is incrementally positioned over the entire gray scale palm image 86 one pixel row or column at a time. At each position, the patch area 46 is compared against the palm biometric data of the gray scale palm image 86 encompassed by the patch area 46 such that a correlation score is determined for each position. An area of the gray scale palm image 86 encompassed by the patch area 46 is referred to herein as a matching area of the gray scale palm image 86. The correlation score indicates the correlation between the patch area 46 and a corresponding matching area of the gray scale palm image 86. Comparing the patch area 46 against the gray scale palm image 86 and generating the correlation scores is referred to herein as applying the patch area 46 against the gray scale palm image 86. It should be understood that the gray scale palm image 86 is rotated through a series of angles and at the same time is scaled through a series of scale factors. For each rotation angle and scale factor combination, the patch area 46 is applied against the gray scale palm image 86.

After calculating the correlation scores for each desired rotation angle and scale factor combination, the best correlation score is determined. Optimum transformation parameters are determined to be the rotation angle and the scale factor that correspond to the best correlation score, as well as the center point coordinates of the matching area that corresponds to the best correlation score. The matching area of the gray scale palm image 86 that corresponds to the patch area 46 at the best correlation score is the optimum area of the gray scale palm image 86. The gray scale palm image 86 is then adjusted by the rotation angle and scale factor corresponding to the best correlation score, and the coordinates of the matching area in the gray scale palm image 86 are calculated using the second Cartesian coordinate system. The rotation angle and the scale factor of the optimum area are also referred to as the optimum rotation angle and the optimum scale factor. The optimum rotation angle, optimum scale factor and the coordinates of the optimum area, together constitute an optimum transformation parameter set.

It should be understood that the authentication region of interest 84 may also be used to generate an authentication mask. Thus, by virtue of knowing the center point coordinates of the patch area 46 in the enrollment region of interest 30, the optimum rotation angle, the optimum scale factor, and the coordinates of the optimum area center point, a transformation necessary for approximately aligning the authentication region of interest 84 with the enrollment region of interest 30 may be calculated. Likewise, the transformation may be calculated for approximately aligning the authentication mask with an enrollment mask generated during enrollment, and for approximately aligning the gray scale palm image 86 with an enrollment gray scale image generated during enrollment. Thus, the transformation is applied against the authentication mask to approximately align the authentication and enrollment masks. The transformation is also applied against the gray scale palm image 86 to approximately align the gray scale palm image 86 with the enrollment gray scale image.

After aligning the authentication and enrollment masks, and aligning the gray scale palm image 86 and the enrollment gray scale image, a biometric template is generated from the aligned gray scale palm image 86. The authentication and enrollment masks are compared to determine a region common to both masks. Biometric template data generated from the aligned gray scale palm image 86 that is also within the common region is used to conduct a biometric authentication matching transaction. The common region may also be referred to as a region of agreement.

In the exemplary embodiment the authentication region of interest 84 is rotated, from its original orientation, through angles ranging from ten degrees clockwise to ten degrees counterclockwise. However, in other embodiments the authentication region of interest 84 may be rotated by angles greater than ten degrees in either the clockwise or counterclockwise directions. Moreover, scale factors are applied to the authentication region of interest 84 that increase and decrease the size of the authentication region of interest 84 by up to twenty percent. However, in other embodiments other scale factors may be applied that increase or decrease the size of the authentication region of interest 84 by greater than twenty percent.

It should be understood that the authentication mask and the gray scale palm image 86 each include the authentication region of interest 84. Thus, all information or data included in the authentication mask and the gray scale palm image 86 is rotated and scaled as described above for the authentication region of interest 84. Computations relating to determination of the optimum area are conducted in the second Cartesian coordinate system.

Figure 15:
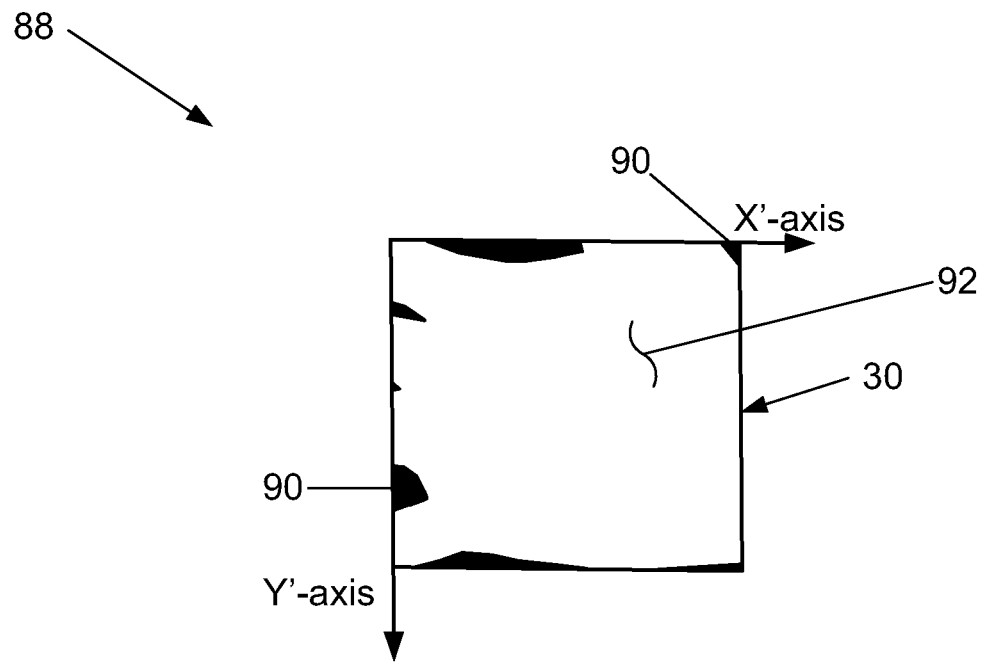
FIG. 15 is a plan view of an enrollment mask generated from the enrollment region of interest during enrollment.

FIG. 15 is a plan view of an enrollment mask 88 generated from the portion of the hand 24 within the enrollment region of interest 30 during enrollment. The enrollment mask 88 includes shaded areas 90 that represent areas not containing valid biometric data within the enrollment region of interest 30. The mask 88 also includes another area 92 that represents areas containing valid biometric data within the enrollment region of interest 30.

Figure 16:
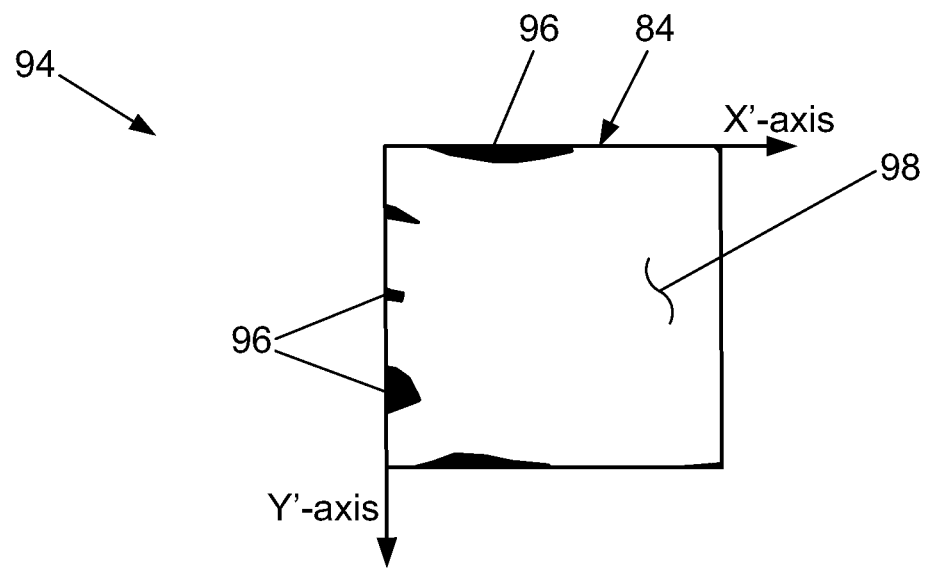
FIG. 16 is a plan view of an authentication mask generated from the authentication region of interest during authentication.

FIG. 16 is a plan view of an authentication mask 94 generated from the portion of the hand image 76 within the authentication region of interest 84 during authentication. The mask 94 includes shaded areas 96 that represent areas not containing valid biometric data within the authentication region of interest 84. The authentication mask 94 also includes another area 98 that represents areas containing valid biometric data within the authentication region of interest 84. During authentication, the enrollment mask 88 and the authentication mask 94 are compared to define a region common to both masks 88, 94. Biometric data within the common region is used for matching during authentication.

Figure 17:
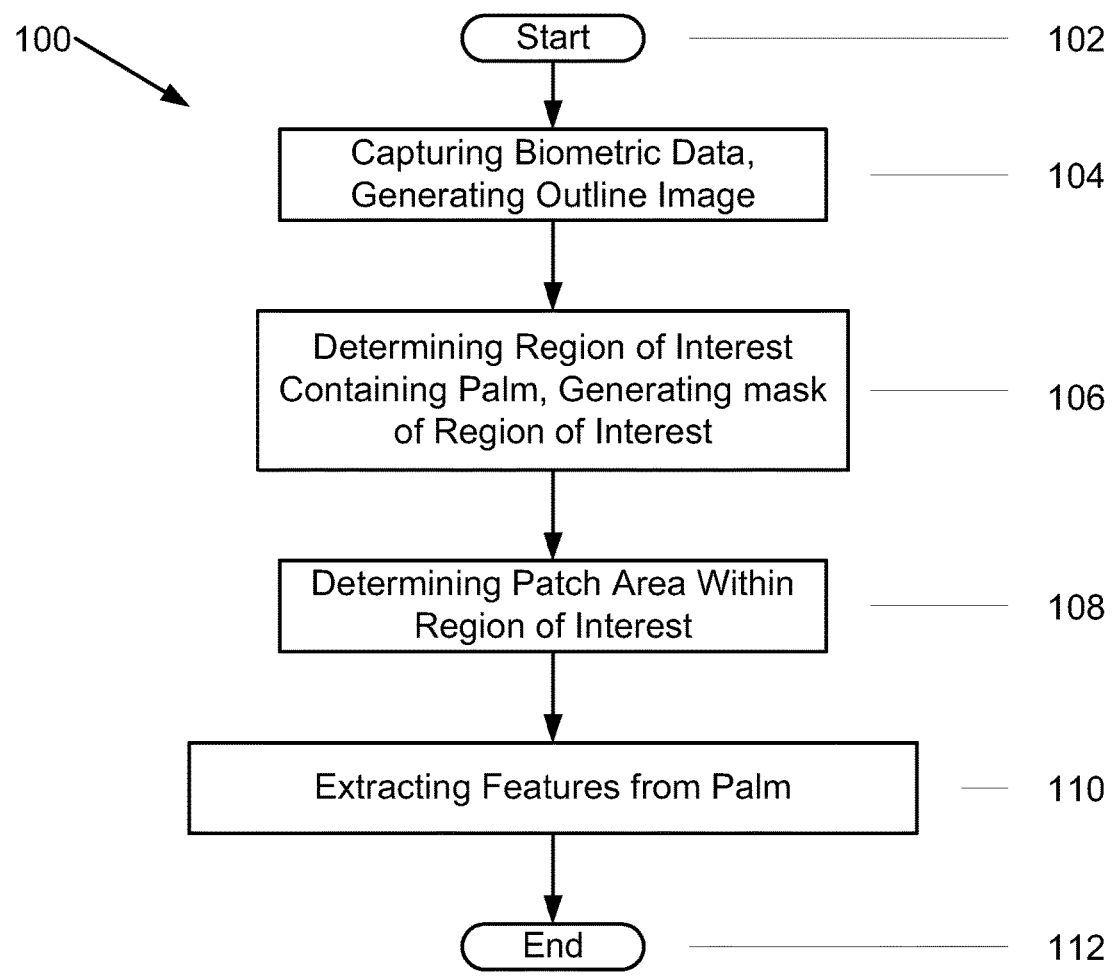
FIG. 17 is a flowchart illustrating an exemplary process for enrolling individuals in a biometric authentication computer (BAC) system.

FIG. 17 is a flowchart 100 illustrating an exemplary process for enrolling individuals in the BAC system 12. The enrolling process starts 102 by activating a security application stored in the device 14. The security application causes the device 14 to display a message prompting the operator to capture desired biometric data. The desired biometric data is the palm side of the right hand. Next, processing continues by capturing biometric data 102, in accordance with the message, from an enrollee with the device 14. Specifically, in the exemplary embodiment the biometric data is captured by photographing the enrollee's hand with the device 14. In the exemplary embodiment a single photograph is taken during enrollment. The device 14 continues processing by transmitting the captured biometric data to the BAC system 12.

Next, the BAC system 12 continues processing by generating 104 the outline image 48, determining 106 the enrollment region of interest 30, and generating 106 the enrollment mask 88. The outline image 48, enrollment region of interest 30, and enrollment mask 88 are stored in the enrollment data record of the enrollee in the BAC system 12.

Processing continues by determining 108 the patch area 46 within the enrollment region of interest 30, processing the patch area 46 into a patch area biometric template, and storing the patch area biometric template in the enrollment data record of the enrollee. After determining 108 the patch area 46, processing continues by extracting biometric features 110 from the captured biometric data included in the enrollment region of interest 30, and processing the extracted biometric features into an enrollment biometric template. Because the enrollment region of interest 30 includes mostly the palm of the hand, the extracted biometric features are palm biometric features. Thus, the enrollment biometric template includes palm biometric data. The enrollment biometric template is stored in the enrollment data record of the enrollee. After extracting the biometric features 110, a message is communicated to, and displayed on, the device 14 notifying the user that enrollment is complete. Next, enrollment processing ends 112.

Figure 18:
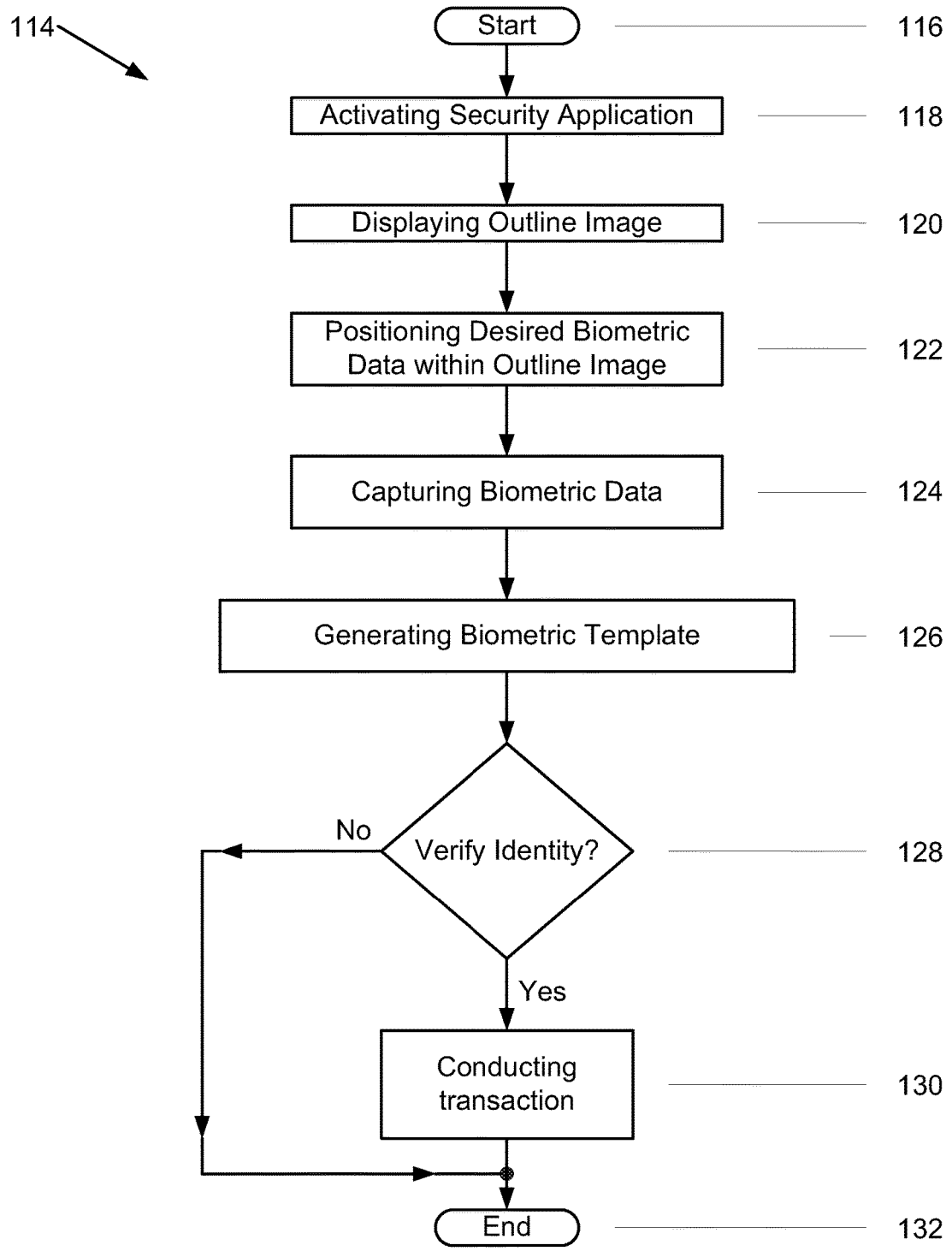
FIG. 18 is a flowchart illustrating an exemplary authentication process.

FIG. 18 is a flowchart 114 illustrating an exemplary authentication process used by the AC system 10 for authenticating the identity of an individual. For AC system 10, the process starts 116 by activating the security application 118 in the device 14 which initiates the authentication process, when the individual desires to be authenticated. It should be appreciated that the individual may desire to be authenticated in many different circumstances including, but not limited to, when conducting any kind of transaction and when requested by security personnel to prove a claim of identity. After initiating the authentication process, the device 14 continues processing by requesting the outline image 48 from the BAC system 12 and the BAC system 12 transmits the requested outline image 48 to the device 14 for use during authentication.

Next, processing continues by displaying a message on the display screen 20 prompting the operator of the device 14 to capture desired biometric data, and displaying 120 the outline image 48 on the display screen 20 in a stationary position. It should be understood that the biometric modality data captured during authentication should be the same as that captured during enrollment. Thus, biometric data corresponding to the palm side of a right hand is captured during authentication. Accordingly, the outline image 48 corresponds to the desired biometric data. Processing continues by positioning the desired biometric data 122 of the individual proximate to, and with respect to, the device 14 such that the desired biometric data appears as a desired biometric image in an initial position on the display screen 20. Next, the operator continues processing by monitoring the desired biometric image shown on the display screen 20 with respect to the outline image 48 shown on the display screen 20, and positioning the device 14 and the desired biometric data with respect to each other, to better align the outline and desired biometric images, when the initial position of the desired biometric image shown on the display screen 20 does not approximately align with the outline image 48 shown on the display screen 20. The device 14 and the desired biometric data are positioned with respect to each other until the desired biometric image shown on the display screen 20 approximately aligns with the outline image 48 shown on the display screen 20. After positioning the device 14 and the desired biometric data such that the desired biometric image shown on the display screen 20 approximately aligns with the outline image 48 shown on the display screen 20, processing continues by capturing the desired biometric data. Specifically, the operator continues processing by photographing the desired biometric data with the device 14. The device 14 continues processing by communicating the captured biometric data to the BAC system 12. In the exemplary embodiment a single photograph is taken during authentication. However, in other embodiments any number of photographs may be taken.

Although the desired biometric data is captured using the outline image 48 during authentication in the exemplary embodiment, it should be understood that biometric data may also be captured in a substantially identical manner during enrollment if an outline image 48 has been generated and stored in the BAC system 12 prior to enrollment.

Next, processing continues by generating an authentication biometric template 126 from the captured biometric data. Specifically, processing continues by determining the authentication region of interest 84 including the palm from the captured biometric data, and generating the gray scale palm image 86 and the authentication mask 96 for the captured biometric data. Processing continues by determining the optimum area within the authentication region of interest 84, and adjusting the scale and angle of the authentication region of interest 84 such that the adjusted authentication region of interest 84 approximately aligns with the enrollment region of interest 30. The authentication and enrollment masks, and the gray scale palm image 86 and enrollment gray scale image are similarly approximately aligned with each other. Next, processing continues by extracting biometric feature data from the aligned gray scale palm image 86 and generating an authentication biometric template 126 from the extracted biometric feature data. The aligned authentication and enrollment masks are compared to determine the region of agreement. Biometric feature data included in the authentication biometric template that is within the region of agreement is used for conducting a biometric verification matching transaction.

Processing continues by verifying the identity 128 of the individual by comparing the biometric feature data included in the authentication biometric template that is within the region of agreement, against corresponding biometric feature data included in the enrollment biometric template and generating a matching score. After generating the matching score, processing continues by comparing the matching score against a predetermined threshold. When the matching score is at least equal to the predetermined threshold the identity of the individual is verified. A message is communicated to, and displayed on, the device 14 notifying the operator of the verification, and processing continues by conducting the network-based transaction 130. Next, processing ends 132. However, when the matching score is less than the predetermined threshold, a message is communicated to, and displayed on, the device 14 notifying the operator that the individual was not verified, and thus cannot conduct the transaction. Next, processing ends 132.

Although a single outline image 48 is generated by and stored in the BAC system 12 in the exemplary embodiment, in other embodiments a plurality of outline images of different biometric modalities, for each individual, may be stored in the BAC system 12. In such other embodiments an outline image of the right hand and an outline image of the left hand may both be stored in the BAC system 12. Thus, prior to requesting the outline image 48 during authentication, the operator may select one of the outline images to be used for authentication. Moreover, when the desired biometric data to be captured includes biometric data of different modalities, outline images corresponding to each different modality may be selected and presented in succession on the display screen 20. For example, the left hand image outline may be displayed first and the right hand image outline may be shown on the display screen 20 second.

In each embodiment, the above-described processes for capturing palm biometric data and applying a transform to the captured palm biometric data, facilitate reducing the time and costs of accurately authenticating the identity of an individual based on palm biometric data captured while positioned freely in space. More specifically, an outline image is generated from hand biometric data captured with a device during enrollment in an authentication system. During authentication, the outline image appears on the device display. While aiming the device at a hand, an image of the hand also appears on the device display. The image of the hand may be positioned within the display to be approximately aligned with the outline image. When the image of the hand approximately aligns with the outline image in the device display, the hand is captured as biometric data by the device. A region of interest defines that palm biometric data included in the captured hand biometric data is to be used during authentication. A transform is calculated and is applied to the captured palm biometric data within the region of interest. The transform causes the captured palm biometric data to have approximately the same size and orientation as the palm biometric data captured during enrollment. As a result, biometric authentication of identities facilitates reducing the time and costs associated with authentication based on palm biometric data captured while positioned freely in space with a device readily available to the members of the general public. Accordingly, biometric authentication of identities is facilitated to be enhanced in a cost effective and reliable manner.

Exemplary embodiments of processes and systems that facilitate convenient, flexible and inexpensive biometric authentication based on palm biometric data are described herein. The processes are not limited to use with the specific computer system embodiments described herein, but rather, the processes can be utilized independently and separately from other processes described herein. Moreover, the invention is not limited to the embodiments of the processes and systems described above in detail. Rather, other variations of the processes may be utilized within the spirit and scope of the claims.

While the invention has been described in terms of various specific embodiments, those skilled in the art will recognize that the invention can be practiced with modification within the spirit and scope of the claims.

What is claimed is:

1. A method for capturing biometric data of an individual comprising the steps of:
   displaying, by a computing device, before capturing at least one facial image of an individual, a visual aid and the face of the individual, the displayed visual aid having a shape independent of the shape of the displayed face of the individual and being a size different than the displayed face of the individual; and
   capturing, by the computing device, at least one facial image of the individual while the displayed face of the individual is near the displayed visual aid.

2. A method for capturing biometric data of an individual in accordance with claim 1 said capturing step further comprising capturing the at least one facial image while the displayed face of the individual is within a tolerance of the displayed visual aid.

3. A method for capturing biometric data of an individual in accordance with claim 1 said capturing step further comprising displaying a prompt to capture biometric data.

4. A computing device for capturing biometric data of an individual comprising:
   a processor; and
   a memory configured to store data, said computing device being associated with a network and said memory being in communication with said processor and having instructions stored thereon, which when read and executed by said processor, cause said computing device to:
   display, before capturing at least one facial image of an individual, a visual aid and the face of the individual, the displayed visual aid having a shape independent of the shape of the displayed face of the individual and being a size different than the displayed face of the individual; and
   capture at least one facial image of the individual while the displayed face of the individual is near the displayed visual aid.

5. A computing device for capturing biometric data of an individual in accordance with claim 4, wherein the instructions when read and executed by said processor, further cause said computing device to capture the at least one facial image while the displayed face of the individual is within a tolerance of the displayed visual aid.

6. A computing device for capturing biometric data of an individual in accordance with claim 4, wherein the instructions when read and executed by said processor, further cause said computing device to display a prompt to capture biometric data.

7. A method for capturing biometric data of an individual comprising the steps of:
displaying, by a computing device, before taking at least one photograph of the face of an individual, a visual aid and the face of the individual, the displayed visual aid having a shape independent of the shape of the displayed face of the individual and being a size different than the displayed face of the individual; and
taking, by the computing device, at least one photograph of the face of the individual while the displayed face of the individual is near the displayed visual aid.

8. A method for capturing biometric data of an individual in accordance with claim 7 said taking step further comprising taking the at least one photograph while the displayed face of the individual is within a tolerance of the displayed visual aid.

9. A computing device for capturing biometric data of an individual comprising:
a processor; and
a memory configured to store data, said computing device being associated with a network and said memory being in communication with said processor and having instructions stored thereon, which when read and executed by said processor, cause said computing device to:
display, before taking at least one photograph of the face of an individual, a visual aid and the face of the individual, the displayed visual aid having a shape independent of the shape of the displayed face of the individual and being a size different than the displayed face of the individual; and
take at least one photograph of the face of the individual while the displayed face of the individual is near the displayed visual aid.

10. A computing device for capturing biometric data of an individual in accordance with claim 9, wherein the instructions when read and executed by said processor, further cause said computing device to take the at least one photograph while the displayed face of the individual is within a tolerance of the displayed visual aid.

11. A method for capturing biometric data of an individual comprising the steps of:
displaying a visual aid and a facial image of an individual by a computing device, the displayed visual aid having a shape independent of the shape of the displayed facial image and being a size different than the displayed facial image; and
capturing, by the computing device, facial image data of the individual exclusively when the visual aid is displayed and while the displayed facial image is near the displayed visual aid.

12. A method for capturing biometric data of an individual in accordance with claim 11 said capturing step further comprising capturing the facial image data while the displayed facial image is within a tolerance of the displayed visual aid.

13. A computing device for capturing biometric data of an individual comprising:
a processor; and
a memory configured to store data, said computing device being associated with a network and said memory being in communication with said processor and having instructions stored thereon, which when read and executed by said processor, cause said computing device to:
display a visual aid and a facial image of an individual, the displayed visual aid having a shape independent of the shape of the displayed facial image and being a size different than the displayed facial image; and
capture facial image data of the individual exclusively when the visual aid is displayed and while the displayed facial image is near the displayed visual aid.

14. A computing device for capturing biometric data of an individual in accordance with claim 13, wherein the instructions when read and executed by said processor, further cause said computing device to capture the facial image data while the displayed facial image is within a tolerance of the displayed visual aid.

15. A method for capturing biometric data of an individual comprising the steps of:
displaying a visual aid and a facial image of an individual by a computing device, the displayed visual aid having a shape independent of the shape of the displayed facial image and being a size different than the displayed facial image; and
taking, by the computing device, at least one photograph of the face of the individual exclusively when the visual aid is displayed and while the displayed facial image is near the displayed visual aid.

16. A method for capturing biometric data of an individual in accordance with claim 15 said taking step further comprising taking the at least one photograph while the displayed facial image is within a tolerance of the displayed visual aid.

17. A computing device for capturing biometric data of an individual comprising:
a processor; and
a memory configured to store data, said computing device being associated with a network and said memory being in communication with said processor and having instructions stored thereon, which when read and executed by said processor, cause said computing device to:
display a visual aid and a facial image of an individual, the displayed visual aid having a shape independent of the shape of the displayed facial image and being a size different than the displayed facial image; and
take at least one photograph of the face of the individual exclusively when the visual aid is displayed and while the displayed facial image is near the displayed visual aid.

18. A computing device for capturing biometric data of an individual in accordance with claim 17, wherein the instructions when read and executed by said processor, further cause said computing device to take the at least one photograph while the displayed facial image is within a tolerance of the displayed visual aid.

19. A method for capturing biometric data of an individual comprising the steps of:
displaying, by a computing device, before capturing at least one facial image of an individual, a visual aid and the face of the individual, the displayed visual aid having a shape independent of the shape of the displayed face of the individual and being a size different than the displayed face of the individual; and
capturing, by the computing device, at least one facial image of the individual while the displayed face of the individual is within the displayed visual aid.

20. A method for obtaining capturing biometric data of an individual in accordance with claim 19 said capturing step further comprising capturing the at least one facial image while the displayed face of the individual is within a tolerance of the displayed visual aid.

21. A computing device for capturing biometric data of an individual comprising:
   a processor; and
   a memory configured to store data, said computing device being associated with a network and said memory being in communication with said processor and having instructions stored thereon, which when read and executed by said processor, cause said computing device to:
   display, before capturing at least one facial image of an individual, a visual aid and the face of the individual, the displayed visual aid having a shape independent of the shape of the displayed face of the individual and being a size different than the displayed face of the individual; and
   capture at least one facial image of the individual while the displayed face of the individual is within the displayed visual aid.

22. A computing device for capturing biometric data of an individual in accordance with claim 21, wherein the instructions when read and executed by said processor, further cause said computing device to capture the at least one facial image while the displayed face of the individual is within a tolerance of the displayed visual aid.

23. A method for capturing biometric data of an individual comprising the steps of:
   displaying, by a computing device, before taking at least one photograph of the face of an individual, a visual aid and the face of the individual, the displayed visual aid having a shape independent of the shape of the displayed face of the individual and being a size different than the displayed face of the individual; and
   taking, by the computing device, at least one photograph of the face of the individual while the displayed face of the individual is within the displayed visual aid.

24. A method for capturing biometric data of an individual in accordance with claim 23 said taking step further comprising taking the at least one photograph while the displayed face of the individual is within a tolerance of the displayed visual aid.

25. A computing device for capturing biometric data of an individual comprising:
   a processor; and
   a memory configured to store data, said computing device being associated with a network and said memory being in communication with said processor and having instructions stored thereon, which when read and executed by said processor, cause said computing device to:
   display, before taking at least one photograph of the face of an individual, a visual aid and the face of the individual, the displayed visual aid having a shape independent of the shape of the displayed face of the individual and being a size different than the displayed face of the individual; and
   take at least one photograph of the face of the individual while the displayed face of the individual is within the displayed visual aid.

26. A computing device for capturing biometric data of an individual in accordance with claim 25, wherein the instructions when read and executed by said processor, further cause said computing device to take the at least one photograph while the displayed face of the individual is within a tolerance of the displayed visual aid.

27. A method for capturing biometric data of an individual comprising the steps of:
   displaying a visual aid and a facial image of an individual by a computing device, the displayed visual aid having a shape independent of the shape of the displayed facial image and being a size different than the displayed facial image; and
   capturing, by the computing device, facial image data of the individual exclusively when the visual aid is displayed and while the displayed facial image is within the displayed visual aid.

28. A method for capturing biometric data of an individual in accordance with claim 27 said capturing step further comprising capturing the facial image data while the displayed facial image is within a tolerance of the displayed visual aid.

29. A computing device for capturing biometric data of an individual comprising:
   a processor; and
   a memory configured to store data, said computing device being associated with a network and said memory being in communication with said processor and having instructions stored thereon, which when read and executed by said processor, cause said computing device to:
   display a visual aid and a facial image of an individual, the displayed visual aid having a shape independent of the shape of the displayed facial image and being a size different than the displayed facial image; and
   capture facial image data of the individual exclusively when the visual aid is displayed and while the displayed facial image is within the displayed visual aid.

30. A computing device for capturing biometric data of an individual in accordance with claim 29, wherein the instructions when read and executed by said processor, further cause said computing device to capture the facial image data while the displayed facial image is within a tolerance of the displayed visual aid.

31. A method for capturing biometric data of an individual comprising the steps of:
   displaying a visual aid and a facial image of an individual by a computing device, the displayed visual aid having a shape independent of the shape of the displayed facial image and being a size different than the displayed facial image; and
   taking, by the computing device, at least one photograph of the face of the individual exclusively when the visual aid is displayed and while the displayed facial image is within the displayed visual aid.

32. A method for capturing biometric data of an individual in accordance with claim 31 said taking step further comprising taking the at least one photograph while the displayed facial image is within a tolerance of the displayed visual aid.

33. A computing device for capturing biometric data of an individual comprising:
   a processor; and
   a memory configured to store data, said computing device being associated with a network and said memory being in communication with said processor and having instructions stored thereon, which when read and executed by said processor, cause said computing device to:
   display a visual aid and a facial image of an individual, the displayed visual aid having a shape independent of the shape of the displayed facial image and being a size different than the displayed facial image; and take at least one photograph of the face of the individual exclusively when the visual aid is displayed and while the displayed facial image is within the displayed visual aid.

34. A computing device for capturing biometric data of an individual in accordance with claim 33, wherein the instructions when read and executed by said processor, further cause said computing device to take the at least one photograph while the displayed facial image is within a tolerance of the displayed visual aid.

\* \* \* \* \*